(12) United States Patent
Gröver et al.

(10) Patent No.: US 7,406,777 B2
(45) Date of Patent: Aug. 5, 2008

(54) METHOD AND APPARATUS EMPLOYING ECCENTRIC BUSHING

(75) Inventors: Christian Gröver, Dohren (DE);
William A. Skinner, Seattle, WA (US);
Mark R. Weiss, Seattle, WA (US); Jude H. Restis, Kent, WA (US)

(73) Assignee: Fatigue Technology, Inc., Seattle, WA (US)

( * ) Notice: Subject to any disclaimer, the term of this patent is extended or adjusted under 35 U.S.C. 154(b) by 59 days.

(21) Appl. No.: 11/107,319

(22) Filed: Apr. 15, 2005

(65) Prior Publication Data

US 2005/0262682 A1 Dec. 1, 2005

Related U.S. Application Data

(60) Provisional application No. 60/562,789, filed on Apr. 15, 2004.

(51) Int. Cl.
*G01D 21/00* (2006.01)

(52) U.S. Cl. .............................. 33/645; 403/71; 411/44

(58) Field of Classification Search ................... 33/645; 411/43–44; 403/DIG. 8, 26, 71
See application file for complete search history.

(56) References Cited

U.S. PATENT DOCUMENTS

| | | | | |
|---|---|---|---|---|
| 646,738 A * | 4/1900 | Ingalls | ......................... | 411/339 |
| 2,216,208 A * | 10/1940 | Michon | ........................ | 83/690 |
| 2,424,521 A * | 7/1947 | Utsch | ........................... | 403/81 |
| 3,076,668 A * | 2/1963 | Famely | ................... | 285/137.11 |
| 3,342,507 A * | 9/1967 | Koch et al. | ............. | 280/86.754 |
| 3,385,624 A * | 5/1968 | Baclini | .................. | 292/341.18 |
| 3,572,770 A * | 3/1971 | Kagi | ........................ | 285/136.1 |
| 3,590,461 A | 7/1971 | Siler | | |
| 4,244,661 A | 1/1981 | Dervy | | |
| 4,309,123 A * | 1/1982 | Moore | ...................... | 403/408.1 |
| 4,621,961 A * | 11/1986 | Gulistan | ...................... | 411/352 |
| 4,753,615 A * | 6/1988 | Weidler et al. | .............. | 439/775 |
| 5,462,381 A * | 10/1995 | DeWachter et al. | ......... | 403/365 |
| 6,050,034 A * | 4/2000 | Krinner | ........................ | 52/155 |
| 6,575,659 B1 * | 6/2003 | Valtwies et al. | ............. | 403/370 |
| 6,848,853 B2 * | 2/2005 | Yamada | .......................... | 403/4 |
| 7,100,264 B2 * | 9/2006 | Skinner et al. | ................ | 29/523 |
| 2005/0117966 A1 * | 6/2005 | Steinbeck | ................ | 403/408.1 |

FOREIGN PATENT DOCUMENTS

| | | |
|---|---|---|
| EP | 1 166 951 A1 | 1/2002 |
| GB | 478369 | 1/1938 |
| GB | 1065414 | 4/1967 |

* cited by examiner

*Primary Examiner*—Christopher W. Fulton
*Assistant Examiner*—Tania C Courson
(74) *Attorney, Agent, or Firm*—Seed Intellectual Property Law Group PLLC

(57) ABSTRACT

An alignment assembly comprises an outer bushing received in an aperture of a work piece, and an eccentric bushing received in a passage of the inner bushing and rotated to align a passage of the eccentric bushing with passages of other work pieces and/or alignment assemblies. An alignment assembly comprises an outer bushing received in an aperture of a work piece, inner bushing received in a passage of the outer bushing, and an eccentric bushing received in a passage of the inner bushing and rotated to align a passage of the eccentric bushing with passages of other work pieces and/or alignment assemblies mounted in other work pieces. Flanges and/or ends may be machined to accommodate off-center passages. The bushings may be secured via cold work expansion.

21 Claims, 25 Drawing Sheets

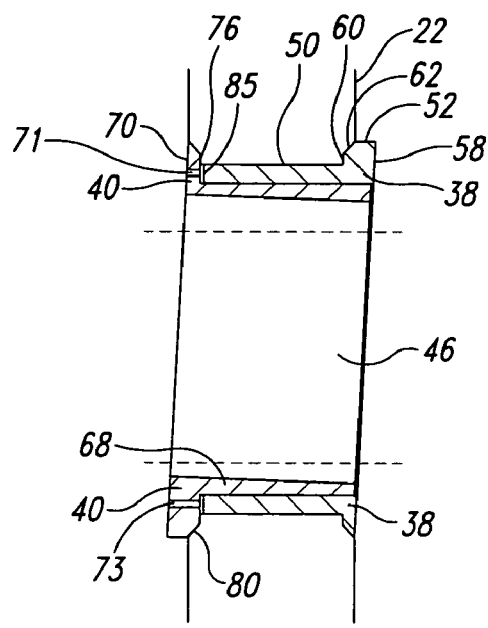
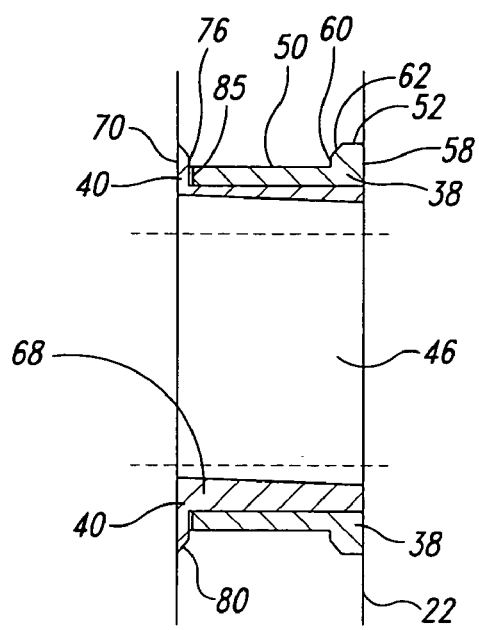
FIG. 7A
FIG. 7B
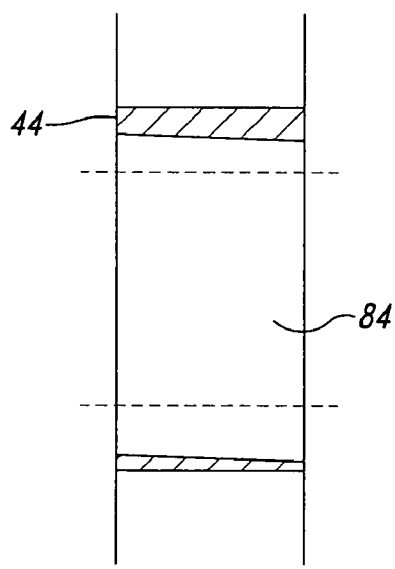
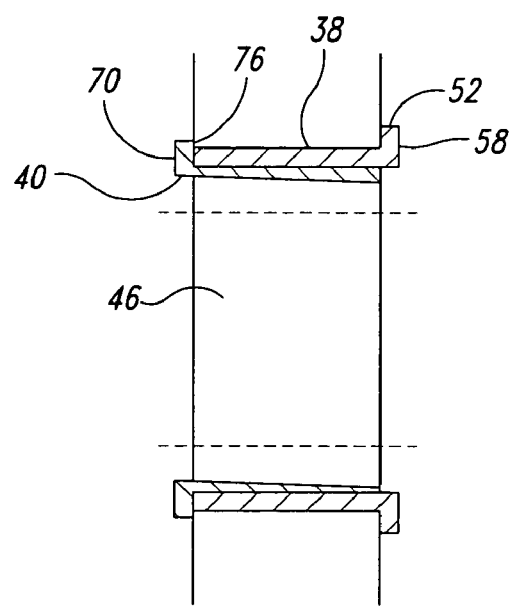
FIG. 7C
FIG. 7D

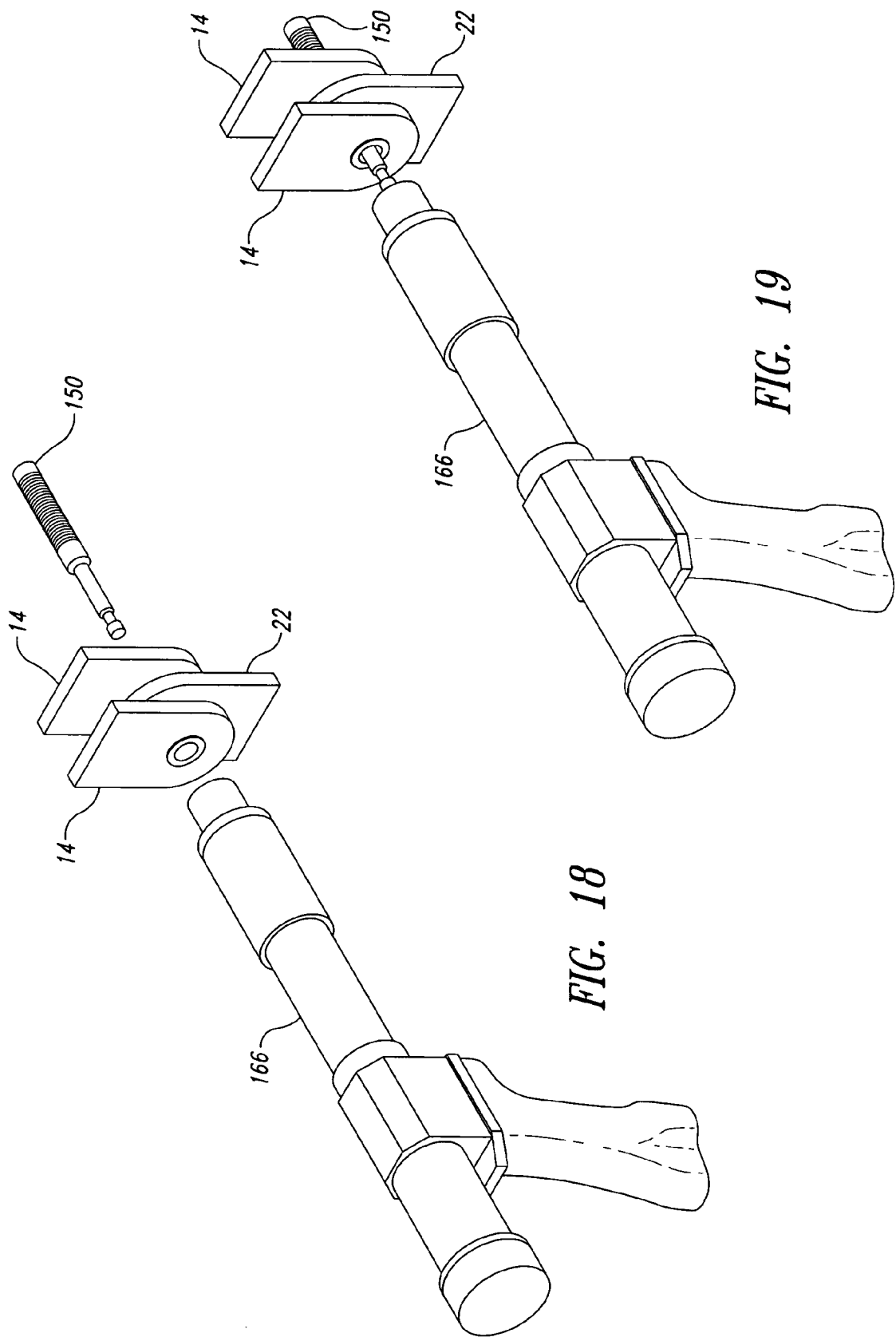

METHOD AND APPARATUS EMPLOYING ECCENTRIC BUSHING

CROSS-REFERENCE TO RELATED APPLICATION

This application claims the benefit under 35 U.S.C. § 119(e) of U.S. Provisional Patent Application No. 60/562,789 filed Apr. 15, 2004, which is incorporated herein by reference in its entirety.

BACKGROUND OF THE INVENTION

1. Field of the Invention

This disclosure is generally related to bushings, and more particularly to bushings suitable to cold-expansion.

2. Description of the Related Art

There are a large number of applications where two or more parts must be joined. In many instances, the parts include apertures which must be aligned within some acceptable tolerance in order to join the parts, for example, using structure such as a pin received through the apertures. However, when the parts are assembled, the apertures may be misaligned with respect to one another for any of a variety of reasons.

One example of this problem is the assembly of a commercial airliner. The components of a commercial airliner are typically manufactured at a large number of different sites in a variety of different countries. The components may be assembled into subassemblies at these sites, or at other sites. The components and/or subassemblies are assembled into a final product at a site that is typically different from the site at which the components and/or subassemblies were produced. Thus, for example, a vertical fin or stabilizer may be manufactured at a first location, while a section of the body of the aircraft to which the vertical stabilizer will be attached is manufactured at a second location. The coupling of the vertical stabilizer to the section of the aircraft may occur at a third location.

The assembly or coupling may require an exceptionally high degree of tolerance or fit to meet the pertinent engineering specifications. This is a particular problem, for example, where the parts are manufactured at different locations. For example, environmental factors such as temperature and/or humidity may vary from location to location. Thus, a part manufactured within a defined tolerance at one location, may be out of tolerance when transported to another location. Additionally, or alternatively, parts manufactured to the same specifications at two different locations may not fit together. Even where the parts are manufactured within defined tolerances, the dimensional variations that are within the acceptable tolerance may add up (i.e., tolerance stack-up) when the parts are assembled. Since the parts are at different locations, it may not be possible to check the fit until final assembly. Even the fact that different sets of measurement tools will be employed at the different sites may hinder a successful assembly.

One approach to sizing apertures includes inserting a bushing into the aperture, securing the bushing in the aperture via cold expansion of the bushing. An expansion tool is used to exert a radially outwardly directed force to create a tight interference fit between the bushing and a sidewall of the aperture. A reaming or other machining operation is typically performed on the bushing to bring the aperture of the bushing within a desired tolerance.

The alignment problem discussed above may be further exacerbated where parts or attachment points follow a contour. Such is the situation with a set of lugs on the vertical stabilizer and the corresponding set of lugs found on the section of the aircraft to which the stabilizer is attached. The lugs of both sets generally follow the contour or camber associated with an airfoil such as the vertical stabilizer.

Present bushing-based approaches fail to adequately address the misalignment problem discussed above. A standard, inexpensive approach to addressing misalignment problems that employs a minimum number of parts would be highly desirable.

BRIEF SUMMARY OF THE INVENTION

In one aspect, an eccentric bushing may be received in an aperture and rotated to achieve alignment with another aperture to receive a fastener such as a pin.

In another aspect, an alignment assembly comprises an outer bushing received in an aperture of a work piece, and an eccentric bushing received in a passage of the inner bushing, the bushings including flanges having upper surfaces machined or beveled to accommodate later off-center machining of a passage. The eccentric bushing is rotated to align a passage of the eccentric bushing with passages of other work pieces and/or alignment assemblies. The bushings may be secured via an interference fit, for example, via cold work radial expansion techniques where the work piece into which the bushings are secured are of suitable materials, such as metal.

In another aspect, an alignment assembly comprises an outer bushing received in an aperture of a work piece, an inner bushing received in a passage of the outer bushing, and an eccentric bushing received in a passage of the inner bushing. The bushings include flanges having upper surfaces machined or beveled to accommodate off-center machining of a passage. The eccentric bushing is rotated to align a passage of the eccentric bushing with passages of other work pieces and/or alignment assemblies mounted in other work pieces. The bushings may be secured via cold work expansion.

In a further aspect, the flanges of bushings may be machined or beveled before shipping the bushings to manufacturers or assemblers of work pieces. Outer, and/or inner bushings may be secured in the work pieces during manufacture or assembly, for example via cold work expansion techniques. Eccentric bushings may be installed at final assembly, rotated to align passages therethrough for receiving a bolt or other fastener, and secured via cold work expansion techniques.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 7A is a cross-sectional view of the inner and outer nested bushings of FIG. 6, received in one of the apertures formed in the lug of the vertical stabilizer.

FIG. 7B is a cross-sectional view of another embodiment of inner and outer nested bushings, received in one of the apertures formed in the lug of the vertical stabilizer, the inner nested bushing having an off-axis aperture centerline with respect to the aperture centerline of the outer nested bushing and the bushing flanges countersunk with the faces of the lug.

FIG. 7C is a cross-sectional view of another embodiment employing a single eccentric bushing received in one of the apertures formed in the lug of the vertical stabilizer without the inner and outer nested bushings and where the eccentric bushing does not include a flange.

FIG. 7D is a cross-sectional view of another embodiment of the inner and outer nested bushings, the inner nested bushing having an off-axis aperture centerline with respect to the aperture centerline of the outer nested bushing, but the bushing flanges not countersunk with the lug.

FIG. 18 is a top right isometric view showing the relative positions of the broach and a puller unit, prior to insertion of the broach through the eccentric bushings.

FIG. 19 is a top right isometric view of the broach received through the eccentric bushings and operatively coupled to the puller unit.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with methods and apparatuses including eccentric bushing have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Further more, the particular features, structures, or characteristics may be combined in any suitable manner in one or more embodiments.

The headings provided herein are for convenience only and do not interpret the scope or meaning of the claimed invention.

Figure 1:
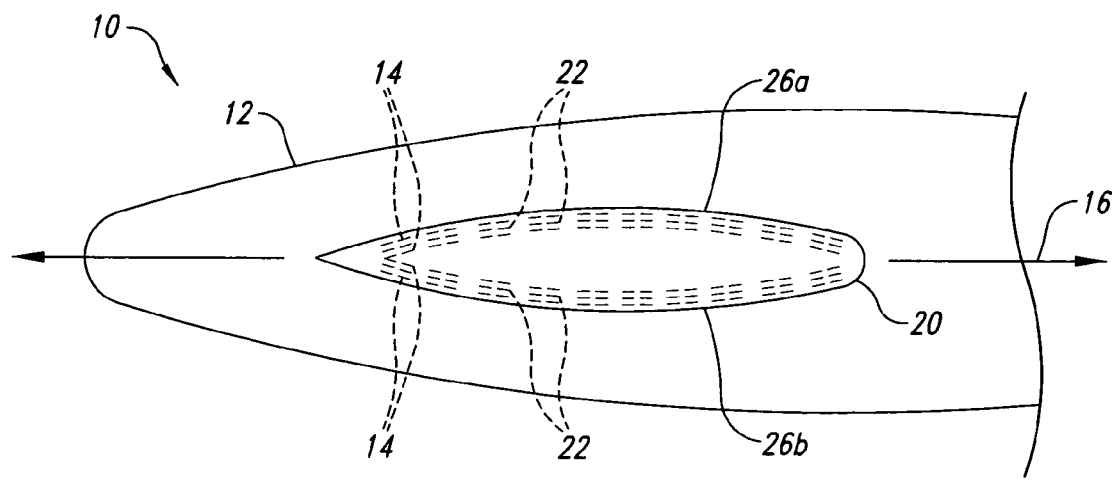
FIG. 1 is a top plan view of a portion of an aircraft including a section bearing a set of lugs for attaching a vertical fin or stabilizer, and the vertical stabilizer and associated lugs according to one illustrated embodiment, the space between the sets of lugs being exaggerated for clarity of illustration.
Figure 2:
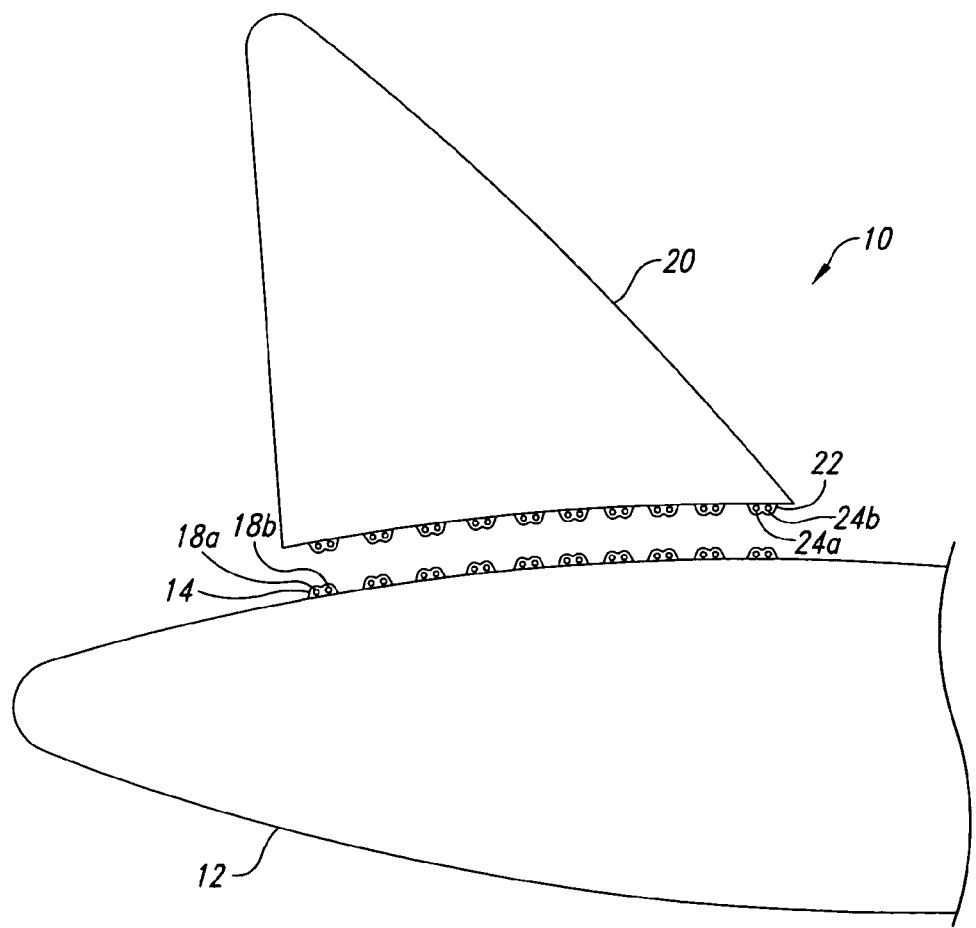
FIG. 2 is a side elevational view of the portion of the aircraft and vertical stabilizer of FIG. 1, the vertical stabilizer spaced away from the portion aircraft to better illustrate the sets of lugs.

FIGS. 1 and 2 show a portion of an aircraft 10 which may include one or more fuselage sections 12. A first set of devises or lugs 14 (shown in solid line) may extend at least partially along a center-line 16 of the fuselage section 12. In the illustrated embodiment, the first set of lugs 14 includes a number of pairs of lugs, the lugs 14 in each pair are spaced generally laterally with respect to one another. In other embodiments, the first set of lugs 14 may include a greater or lesser number of lugs, which may be grouped individually or in subsets other than pairs. Each of the lugs 14 may include a number of holes or apertures for making connections. For example, in the illustrated embodiment, the lugs each include a first and a second aperture 18a, 18b, respectively. In other embodiments the lugs 14 may include a greater or lesser number of apertures.

FIGS. 1 and 2 also show a vertical fin or stabilizer 20. The vertical stabilizer 20 generally extends vertically from the aircraft 10 and serves as a control surface for the aircraft 10. The aircraft 10 may also include horizontal fins or stabilizers, which are omitted from the Figures for sake of clarity. The vertical stabilizer 18 includes a set of lugs 22. The lugs 22 general extend at least partially along a center-line of the vertical stabilizer, and are spaced accordingly to be received between the lugs 14 of respective pairs of lugs 14 when the vertical stabilizer 20 is mounted to the fuselage section 12. Each of the lugs 22 on the vertical stabilizer includes a number of apertures for approximately aligning with apertures on corresponding lugs 14 on the fuselage section 12. Thus, in the illustrated embodiment each lug 22 of the vertical stabilizer 20 includes a first and a second aperture 24a, 24b, corresponding to the first and the second apertures 18a, 18b on the corresponding lugs 14 of the fuselage section 12. The assembly of the vertical stabilizer and fuselage section is used herein for exemplary purposes, however it is understood that the subject matter disclosed and taught may be employed on other assemblies within or outside of the commercial jetliner industry.

The vertical stabilizer 20 is an airfoil, and thus includes an opposed pair of cambered surfaces 26a, 26b, best illustrated in FIG. 1. At least some of the lugs 14 on the fuselage section 12 of the aircraft 10, as well as their counterpart lugs 22 of the vertical stabilizer, generally follow a camber line 26a, 26b that is typically not parallel with the center-line 16 of the fuselage 12.

Figure 3:
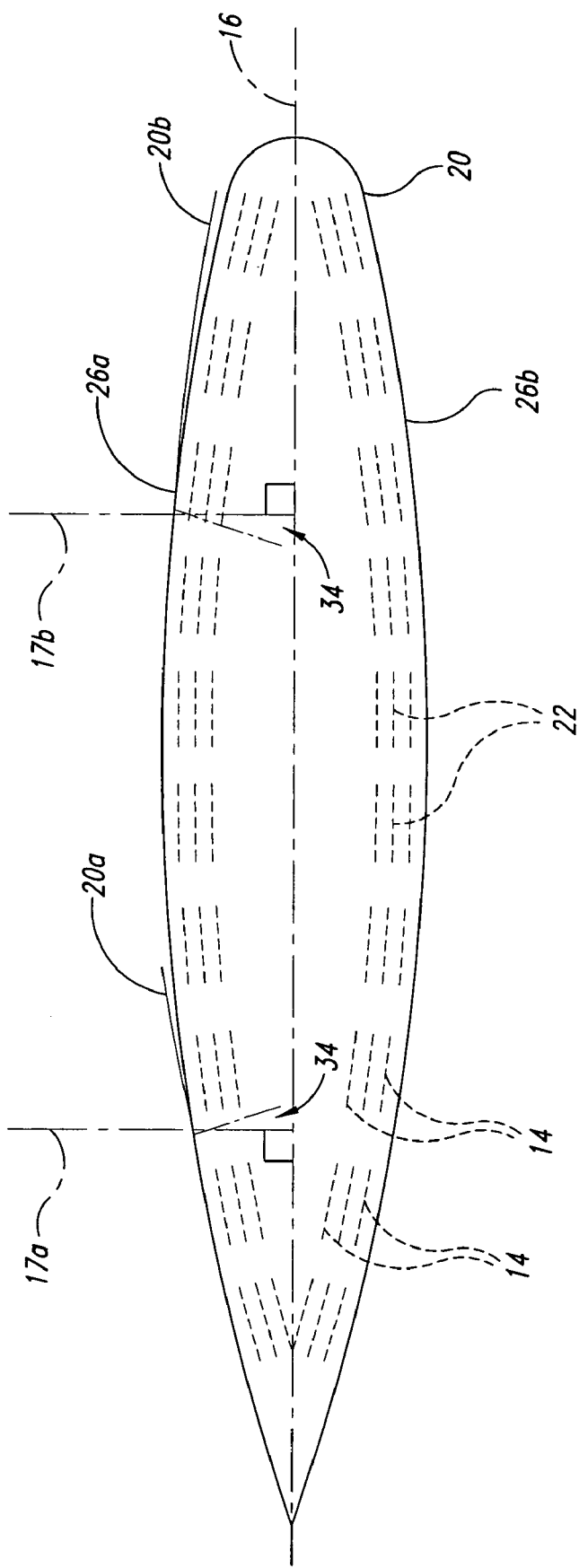
FIG. 3 is an exaggerated top plan view of the section bearing a set of lugs for attaching a vertical fin or stabilizer of FIG. 1, the alignment of the lug bore centerlines being substantially perpendicular to the fuselage centerline.

FIG. 3 illustrates the relationship between the fuselage centerline 16 and the aperture centerlines 17a and 17b of the lugs 14 and 22. The mounting footprints of the lugs 14 and 22 generally follow the camber lines 26a and 26b and can be generally parallel to the camber surface tangent lines 20a or 20b, for example. One illustrated option for drilling the lug apertures 18 and 24 (depicted by aperture centerlines 17a and 17b) is to drill the apertures perpendicular to the fuselage centerline 16, instead of drilled the apertures to be perpendicular to the tangent lines 20a or 20b of the camber surface. Such a configuration can result in up to 4.5 degrees of misalignment 34. Other configurations may result in a greater or less amount of misalignment. As used herein, misalignment may include intentional misalignment, unintentional misalignment, or a combination of intentional and unintentional misalignment. The effect of the misalignment 34 is readily predictable during designing and can be accounted for with custom designed washers, bushing flanges, or other features as will be discussed in detail below. A second type of misalignment that may occur is due to dimensional changes resulting from humidity or temperature variations. This second type of misalignment may also occur due to tolerance stack-up, which is a bit more predictable, but nonetheless needs to be accounted for before final assembly of the vertical stabilizer 20 to the fuselage 12. A significant portion of the remaining discussion describes the various misalignment scenarios and the innovative ways such misalignment may be accounted for while meeting detailed engineering specifications directed to the structural integrity of the assembly.

Figure 4:
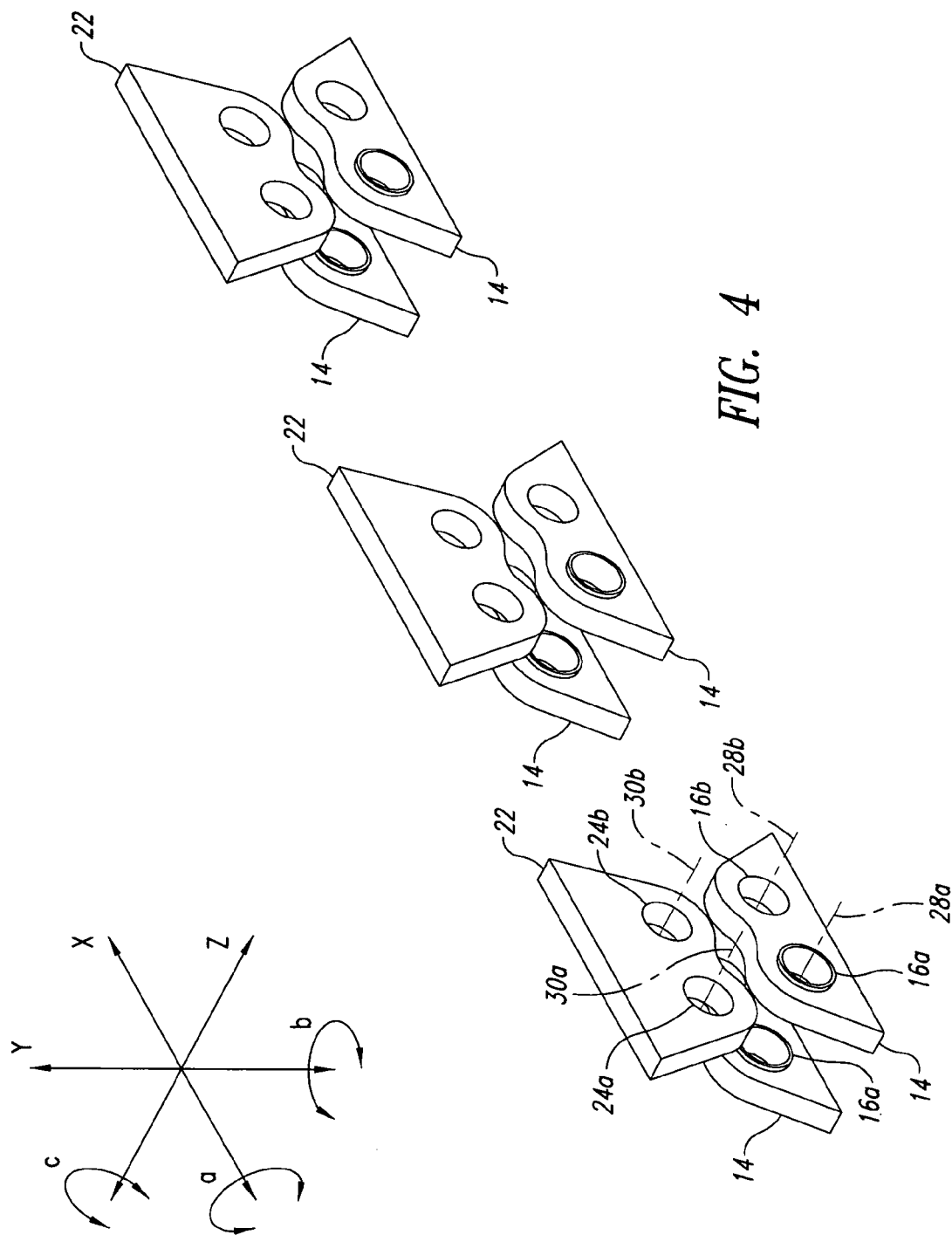
FIG. 4 is a top right isometric view showing three of the lugs carried by the vertical stabilizer and three corresponding pairs of lugs carried by the section of the aircraft.

FIG. 4 shows three pairs of lugs 14 of the fuselage section 12 of the aircraft 10, and the corresponding three lugs 22 of the vertical stabilizer 20. FIG. 3 further illustrates a lug coordinate system having translational axes "X," "Y," and "Z," and rotational axes "a," "b," and "c." The footprint of the lugs 14 and 22 are generally parallel to the "X" axis. However, depending on the location of the lug set 14 and 22 along the camber line 26a or 26b, the aperture axes 28a, 28b, 30a, and 30b can be offset (i.e., not parallel) from the "Z" axis. FIG. 3 shows the lugs 22 of the vertical stabilizer 20 spaced vertically above the lugs 22 of the fuselage section 12 to better illustrate the structure of the lugs 14, 22. When the vertical stabilizer 20 is attached to the fuselage section 12, the longitudinal axes 30a, 30b of the apertures 24a, 24b of the lugs 22 should approximately line up along the same line of action as the longitudinal axes 28a, 28b of the apertures 18a, 18b of the lugs 14 to accommodate a fastener (not shown in FIG. 3) received therethrough, as is explained more fully below.

Figure 5A:
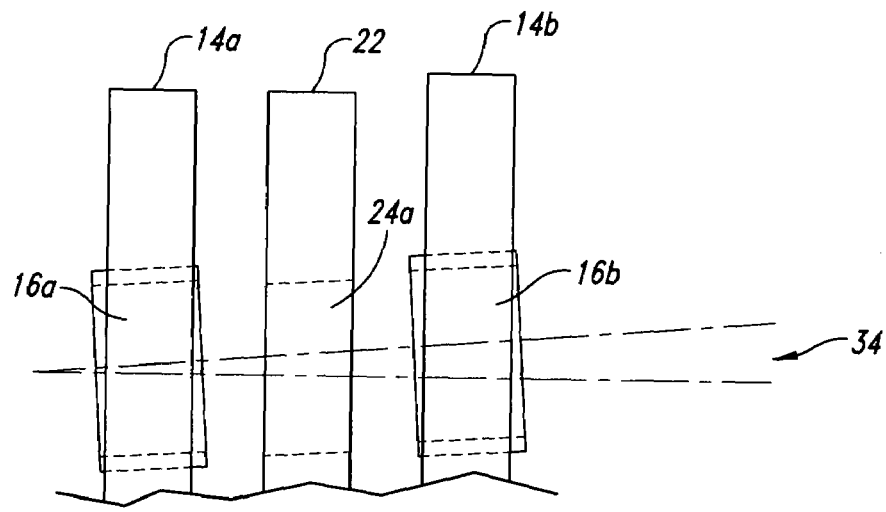
FIG. 5A is a cross-sectional view taken along a plane extending parallel with a top plan view and passing through the center of one aperture formed in a lug, where the lug includes a conventional cold-expansion bushing received in its aperture, the view illustrating one type of alignment problem which may be intentional or unintentional, where the alignment and the space between the sets of lugs are exaggerated for clarity of illustration.
Figure 5B:
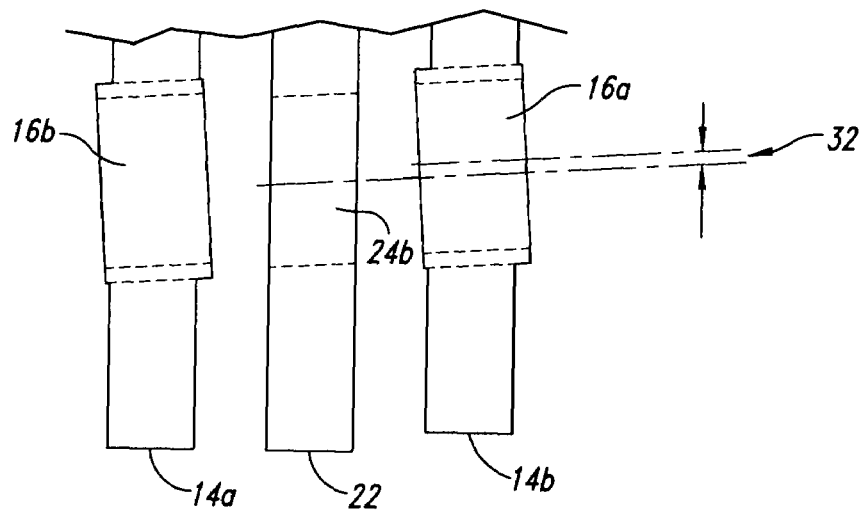
FIG. 5B is a cross-sectional view taken along a plane extending parallel with a top plan view and passing through the center of one aperture formed in a lug, where the lug includes a conventional cold-expansion bushing received in its aperture, the view illustrating a second type of misalignment problem, where the misalignment and the space between the sets of lugs are exaggerated for clarity of illustration.

FIGS. 5A and 5B show one set of lug aperture centerlines, representing lugs 14 of the fuselage section 12 and the corresponding lug 22 of the vertical stabilizer 20 to illustrate in exaggeration, the misalignment problems discussed above. As illustrated in FIG. 5A, the first type of misalignment 34 that must be accounted for during later assembly and installation is due to the perpendicular orientation of the aperture(s) 18a, 18b, 24a, 24b with respect to the center-line 16 of the fuselage. Again, this misalignment 34 may be up to 4.5 degrees or in the event of a different shaped vertical stabilizer or larger-scale vertical stabilizer, the misalignment may be larger than 4.5 degrees.

FIG. 5B illustrates the second type of misalignment 32, which may be up to 0.8 mm (again this size may be greater depending on the shape or the dimensions of the vertical stabilizer). The second type of misalignment 32 results in the aperture centerline of one lug 14a having a translational (eccentric) offset from the aperture centerline of an adjacent lug, which can be lug 22, lug 14b, or both. During assembly and installation, both types of misalignments, 32 and 34, must be properly accounted for in order to minimize installation problems and to later minimize the amount of stress transferred through the joint when the structure is subjected to its operating environment. Additionally, some assembly scenarios may present both angular and axial misalignment in combination.

Figure 6:
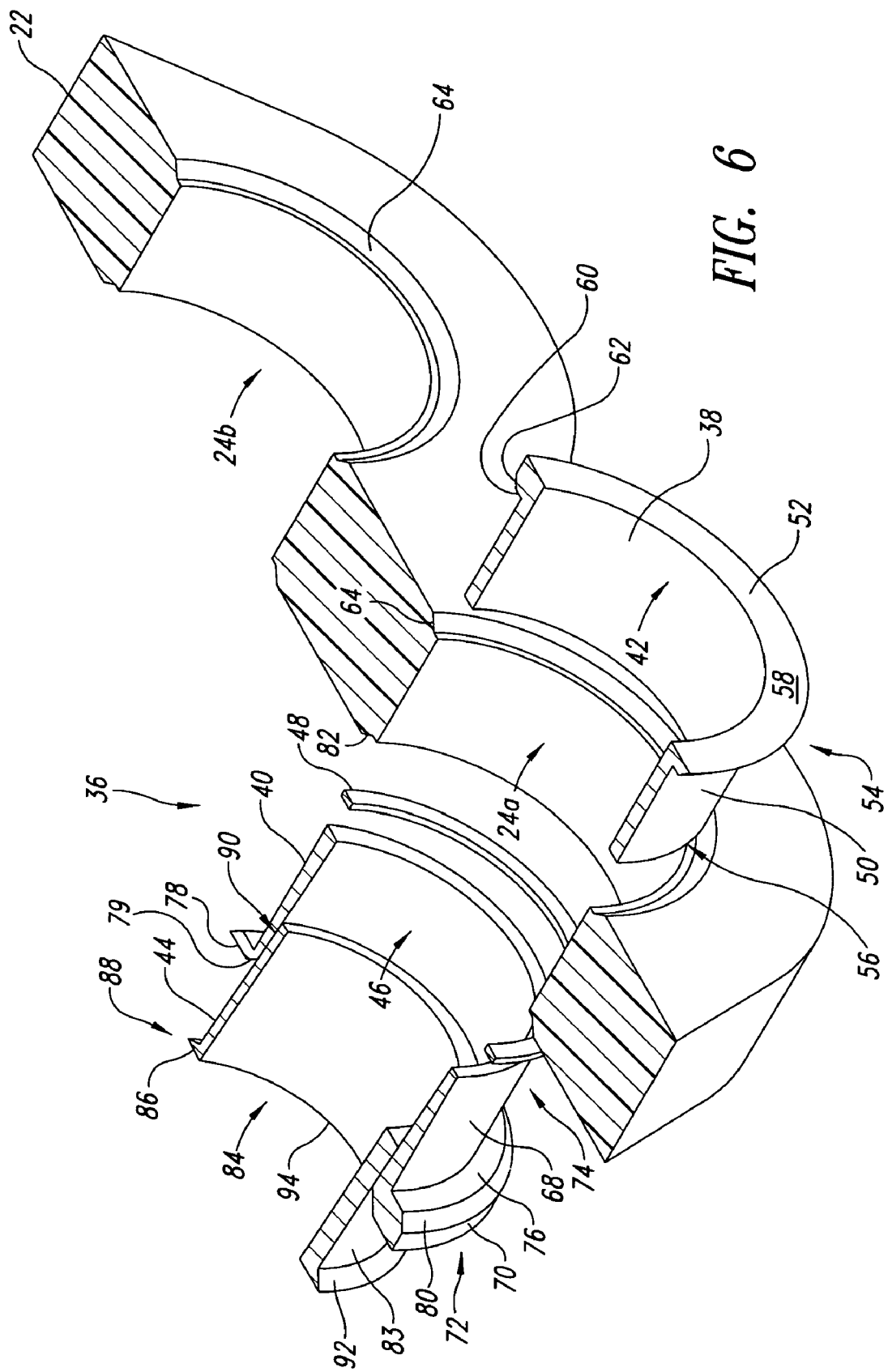
FIG. 6 is a partial isometric view of a set of bushings receivable in the apertures formed in the lug of the vertical stabilizer according to one illustrated embodiment, including an inner nested bushing, an outer nested bushing, a captured washer, and an eccentric bushing.

FIG. 6 shows an alignment assembly 36 suitable for use with a lug body formed from a composite material. Such a composite material may be any variety of a fiber reinforced matrix. For example, the lugs 22 of the vertical stabilizer 20 may be formed from a composite, such as a carbon graphite epoxy composite. Because composite structures generally react to stress and environmental factors differently than their metal counterparts, there is an array of possible failure modes that must be addressed when configuring an interface between composite components, especially in a high load transfer joint. One concern of particular emphasis in a high load transfer joint is the potential for fiber delamination either during assembly or under high stress conditions. One skilled in the art will appreciate and understand the various design requirements for composite joints and a detailed discussion of such fundamentals, such as delamination phenomena, is not included.

The alignment assembly 36 may be used with each of the apertures 24a, 24b in a composite lug, for example, lug 22 of the vertical stabilizer 20 in the present embodiment. The alignment assembly 36 comprises an outer nested bushing 38 closely received (e.g., clearance fit) in the respective one of the apertures 24a, 24b, an inner nested bushing 40 closely received (e.g., clearance fit) in the passage 42 formed in the outer nested bushing 38, and an eccentric bushing 44 closely received (e.g., clearance fit, allowing rotation) in the passage 46 formed in the inner nested bushing 40. The alignment assembly 36 may also include a washer 48 captured by the outer and inner nested bushings 38, 40, respectively. As used herein, the term "nested" connotes the cooperation and structural relation between the outer nested bushing 38 and the inner nested bushing 40, where the inner nested bushing 40 is received in the outer nested bushing 38 in opposed relation thereto, and both are inserted into an aperture (e.g., apertures 24a, 24b) and fixed therein as a unit, or fixed therein one at a time. In some applications, this structural relationship allows the nested bushings 38, 40 to accommodate structures (e.g., lugs 14, 22) of varying thickness. In some embodiments, the outer and inner bushings 38, 40 may be fixed in the apertures 24a, 24b one at a time, hence would not be denoted as being nested. While the below description is discussed in terms of nested bushings 38, 40, it will be apparent to those of skill in the art that some applications may permit or require the use of fewer or greater number of bushings, and that those bushings may be individually installed in the apertures.

The outer nested bushing 38 comprises a generally tubular body 50 forming the longitudinally extending passage 42 and a radially extending flange 52 formed at a first end 54 of the outer nested bushing 38, opposed to a second end 56 thereof. The flange 52 includes an upper surface 58 and a lower surface 60. The outer nested bushing 38 is preferably formed from material suitable for use with cold-expansion techniques, such as those disclosed in commonly assigned U.S. Pat. Nos. 4,423,619; 4,425,780; 4,471,643; 4,557,033; 4,809,420; 4,864,732; 4,885,829; 4,934,170; 5,083,363; 5,096,349; 5,103,548; 5,127,254; 5,218,584; 5,245,743; 5,305,627; 5,341,559; 5,380,136; 5,405,228; 5,433,100; 5,468,104; 6,007,010; and 6,183,180.

Figure 10:
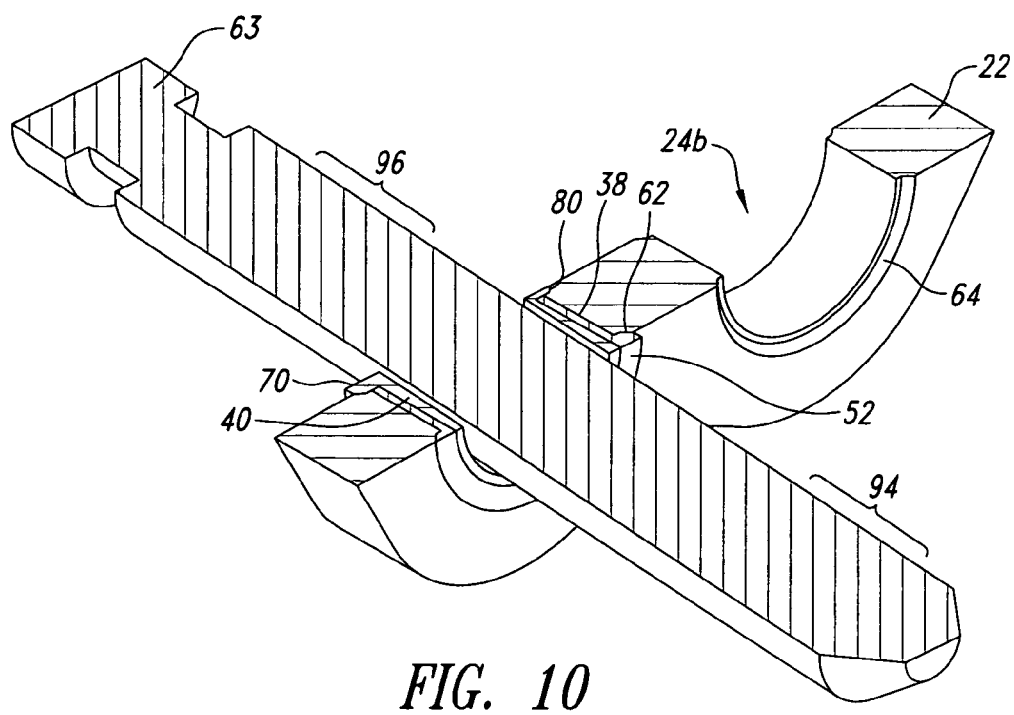
FIG. 10 is a cross-sectional view showing a mandrel received through a passage formed in the inner nested bushing received in one of the apertures formed in the lug of the vertical stabilizer.
Figure 11:
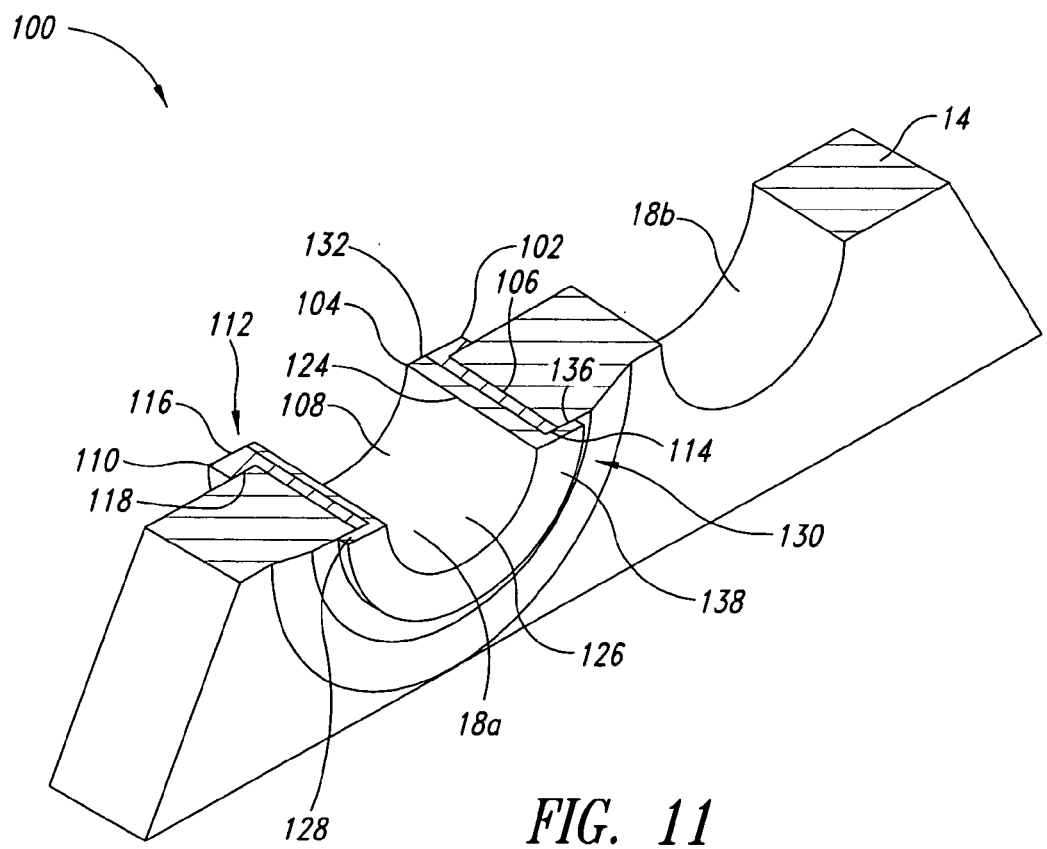
FIG. 11 is a top right isometric view of a lug on the fuselage section of the aircraft, and bushings received in apertures formed in the lug according to an illustrated embodiment.

In at least some embodiments, cold expansion, for example via a mandrel 63 (FIG. 10) is employed to create a tight interference fit for securing the outer nested bushing 38 in the respective apertures 18a, 18b, 24a, 24b (FIG. 11). For the sake of brevity and clarity, FIG. 6 illustrates apertures 24a and 24b of lug 22. A suitable material may for example, include titanium or titanium alloy, which produces a particularly strong bond between the bushings 38, 40, 44 when cold worked using radial expansion. While shown as being a single solid integral piece, the outer nested bushing 38 may be formed with a split, for example a longitudinally extending split, or from two or more pieces, for example individual body 50 and flange 52 elements physically coupled to one another.

The lower surface 60 of the flange 52 may include a bevel or chamfer 62 about a perimeter portion to accommodate a bevel or chamfer 64 about the aperture 24a, 24b in which the outer nested bushing 38 will be received. The flange 52 may provide structural support to the lug 22 in order to prevent or limit delamination where the lug 22 is formed from a composite material.

Referring briefly to FIG. 7A, the upper surface 58 of the flange 52 may be beveled. In addition, the longitudinal thickness (longitudinal being substantially parallel to the aperture centerline) of the flange 52 may vary radially from the upper flange region to the lower flange region. The change in longitudinal flange thickness is to accommodate the anticipated misalignment 34, recalling that the misalignment 34 may result from boring the lug apertures to be substantially perpendicular to the fuselage centerline 16.

Referring back to FIG. 6, a second end 56 of the outer nested bushing 38 may also be beveled to accommodate the anticipated misalignment 34 the assembly 36. As discussed more fully below, the beveling or machining of the upper surface 58 and the second end 56 of the outer nested bushing 38 may occur at the manufacture of the outer nested bushing 38, before delivery of the outer nested bushing 38 to the manufacturer or assembler of the work piece (e.g., vertical stabilizer 20) into which the outer nested bushing 38 will be installed, reducing costs and installation time while also reducing the forces that must be applied to the work piece.

With continuing reference to FIG. 6, the inner nested bushing 40 comprises a generally tubular body 68 forming the longitudinally extending passage 46, and a radially extending flange 70 formed at a first end 72 of the inner nested bushing 40, opposed to a second end 74 thereof. The flange 70 includes a lower surface 76 and upper surface 78. The inner nested bushing 40 is preferably formed from material suitable for use with cold-expansion techniques, as discussed above, and may be secured in the respective aperture 24a, 24b, for example, via cold expansion by use of the mandrel 63 (FIG. 10).

The lower surface 76 of the flange 70 may include a bevel or chamfer 80 about a perimeter portion to accommodate a bevel or chamfer 82 about the aperture in which the outer nested bushing 38 will be received. Providing a relatively thick flange may also protect the flange 70 from cracking when subjected to radial expansion forces.

The upper surface 78 of the flange 70 may be machined or beveled to accommodate the anticipated misalignment 34.

The second end 74 may also be machined or beveled to accommodate the misalignment 34. Thus after appropriate machining, the upper surface 78 of the flange 70 aligns substantially parallel with the upper surface of the flange 52. Likewise, the second end 74 of the inner nested bushing 40 can also be substantially parallel with the surface identifying the second end 56 of the outer nested bushing 38. As discussed in more detail below, the machining or beveling may occur during manufacturing of the inner nested bushing 40, for example prior to distribution to the manufacturer of the assembly into which the bushing will be installed, such as prior to distribution to the manufacturer of the vertical stabilizer 20. The assembly 36, as discussed up to this point, utilizes both an outer and inner nested bushing, 38 and 40, which can be predictably machined and cold expansion installed to account for the misalignment 34 (angular offset of the lug aperture centerline with respect to the lug footprint axis "X," as discussed above).

Still referring to FIG. 6, the eccentric bushing 44 can be used to complete the assembly 36. The eccentric bushing 44, as will be discussed in greater detail, permits the lug aperture centerlines to be adjusted such that they are aligned to be substantially concentric, thus permitting efficient installation of a fastener. The eccentric bushing 44 may also be expandably affixed (e.g., cold expansion techniques) within the assembly 36. The eccentric bushing 44 includes a generally tubular body 83, and forming a longitudinally extending passage 84, and a radially extending flange 86 formed at a first end 88 of the eccentric bushing 44, opposed to a second end 90 thereof. The eccentric bushing 44 is preferably formed from material suitable for use with cold-expansion techniques, as discussed above, for example stainless steel or titanium, and may be secured in the respective aperture 24a, 24b, for example, via cold expansion using of the mandrel 63 (FIG. 10). While shown as being a single solid integral piece, the eccentric bushing 44 may be formed with a split, for example a longitudinally extending split, or from two or more pieces, for example individual body 83 and flange 86 elements physically coupled to one another.

The flange 86 may be beveled of chamfered for being closely received by a bevel or chamfer about the perimeter of the passage 46 through the inner nested bushing 40, which may help retain the eccentric bushing 44 in the passage 46 as the eccentric bushing is rotated to align with other eccentric bushings as explained in detail below.

The flange 86 may contain a machined or beveled region 92 to accommodate the anticipated off-center installation of the alignment assembly 36 and to complementarily mate with a countersink 79 formed in the inner nested bushing 40. The second end 90 may also be beveled to accommodate the anticipated off-center installation of the alignment assembly 36. Thus, the upper surface 94 of the flange 86 is flush with the upper surface 78 of the flange 70, and the second end 90 is flush with the second end 74 of the inner nested bushing 40. As discussed in more detail below, the machining or beveling may occur during manufacturing of the eccentric bushing 44, for example prior to distribution to the manufacturer of the assembly into which the bushing will be installed, such as prior to distribution to the manufacturer of the vertical stabilizer 20.

FIG. 7B illustrates an embodiment where the same type of bushings are used for the assembly 36 described above; however, in FIG. 7B, the longitudinal thickness of the bushings is not varied to account for the misalignment 34. Instead, the inner and outer nested bushings, 40 and 38, respectively, are installed perpendicular with respect to the faces of the lug 22, expanded in place, and then the aperture 46 of the inner nested bushing 40 is drilled, reamed or otherwise machined at an appropriate angle to account for the misalignment 34. The starting thickness of the inner nested bushing 40 must be sufficient to allow removal of at least some amount of material along the entire surface of the bore when the off-axis bore is drilled.

FIG. 7C shows the use of a single eccentric bushing 44, without the inner or outer nested bushings 38, 40. The eccentric bushing does not have any outstanding radial flanges, and is received flush in the aperture 24a, 24b of lug 22.

FIG. 7D illustrates an embodiment similar to that of FIG. 7B, except the flanges 52, 70 of the nested bushings 38, 40, respectively, are flush with the faces of the lug 22, rather than being received in countersinks.

Figure 8:
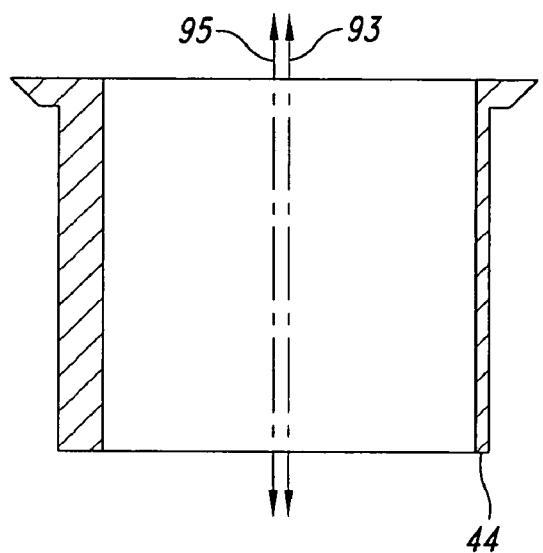
FIG. 8 is a cross-sectional view of an eccentric bushing according to one illustrated embodiment.
Figure 9:
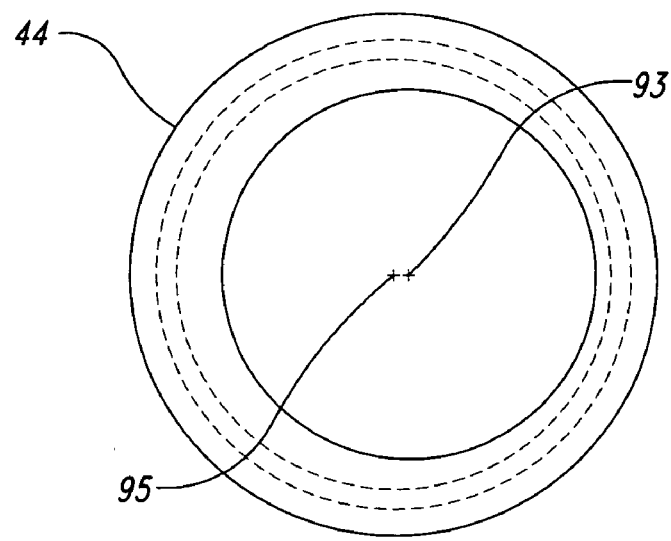
FIG. 9 is top plan view of the eccentric bushing of FIG. 8.

FIGS. 8 and 9 illustrate the eccentric bushing 44 alone. Recalling that the eccentric bushing has an outer diameter 83 and an inner diameter 84, the outer diameter 83 may be represented as a surface of revolution having a longitudinal axis 95, while the inner diameter 84 may be represented as a surface of revolution having a longitudinal axis 93. Thus, the passage 84 of the eccentric bushing 44 is offset (i.e., not concentrically aligned with respect to the outer diameter 83). The outer diameter 83 can be sized to be closely (e.g., clearance fit) received by the passage 46 of the inner nested bushing 40. Once the eccentric bushing 44 is inserted into the inner nested bushing 40, the eccentric bushing 44 may be rotated within the inner nested bushing 40 about its longitudinal axis 95, thus causing the eccentric axis 93 to become substantially aligned with the passages of adjacently located bushings, which have been assembled into other lugs, for example. Once the passages are substantially aligned, the eccentric bushing 44 may be cold-expanded to fix the eccentric bushing 44 in the aperture (e.g., fixed in passage 84 of inner nested bushing 40) with the desired rotational orientation.

Referring back to FIG. 6, some embodiments may employ a washer 48. The washer 48 is captured between the second end 56 of the outer nested bushing 38 and the lower surface 76 of the flange 70 of the inner nested bushing 40. The washer 48 occupies the space or gap 85 (FIG. 7A) between the outer nested bushing 38 and the inner nested bushing 40 which may result from work pieces such as the lugs 14, 22 having varying thickness within some defined tolerance. For example, while the lugs 22 may be manufactured with a dimensional tolerance of a few millimeters, tenths of millimeters or even hundredths of millimeters, it may still be advantageous to provide an even closer fit between the flanges 52, 70 of the nested bushings 38, 40 and the lug 22, particularly where the lug 22 is formed from a composite material. The washer 48 may be formed from a variety of materials, for example stainless steel or titanium.

Washers 48 of varying thickness may be provided, and/or multiple washers 48 may be stacked together to fill the space or gap 85. Thus, the washer 48 permits defined or desired tolerances between the nested bushings 38, 40 to be met using a minimum number of bushings, which typically cost more to manufacture than washers, thereby reducing costs, parts counts and/or inventory. Alternatively and in lieu of using washers, nested bushings 38, 40 can be of a variety of lengths, which may be selected to form an alignment assembly 36 within a specified tolerance.

In alternative embodiment omitting the washers 48, two or more holes 71, 73 (shown in broken lines in FIG. 7A, which indicates the holes as optional configurations) are provided through the flange of the inner nested bushing 40, providing fluid communication with the space or gap 85. One hole 71 serves as an inlet for injecting an adhesive into the space or gap 85, while the other hole 73 serves as an outlet for relieving pressure from the space or gap 85 in response to the injection of the adhesive.

FIG. 10 shows the mandrel 63 received through the passages 42, 46 of the outer and inner bushings, 38, 40, respectively. The mandrel 63 has a constant diameter section 96, and a radially expanded diameter section 96, which is larger than the constant diameter section 96 and is spaced longitudinally therefrom. The constant diameter section 96 may have a diameter, radius or circumference set to a defined value, allowing the constant diameter section 96 of the mandrel 63 to be used as an alignment tool or "bolt" to check alignment.

The radially expanded diameter section 94 applies radial force to the inner nested bushing 40 as the mandrel 63 is longitudinally moved through the passage 84, which transfers the radial force to the outer nested bushings 38, respectively. Proper selection of the diameter of the radially expanded diameter section 96 ensures adequate expansion of the nested bushings 38, 40, producing a tight interference fit between the inner nested bushing 40 and the outer nested bushing 38, as well as between the outer nested bushing 38 and the respective aperture 18a, 18b, 24a, 24b. As discussed in more detail below, a similar mandrel with a radially expanded diameter section 96 having an appropriate diameter can be employed to produce a tight interference fit between inner nested bushing 40 and the eccentric bushing 44.

Figure 12A:
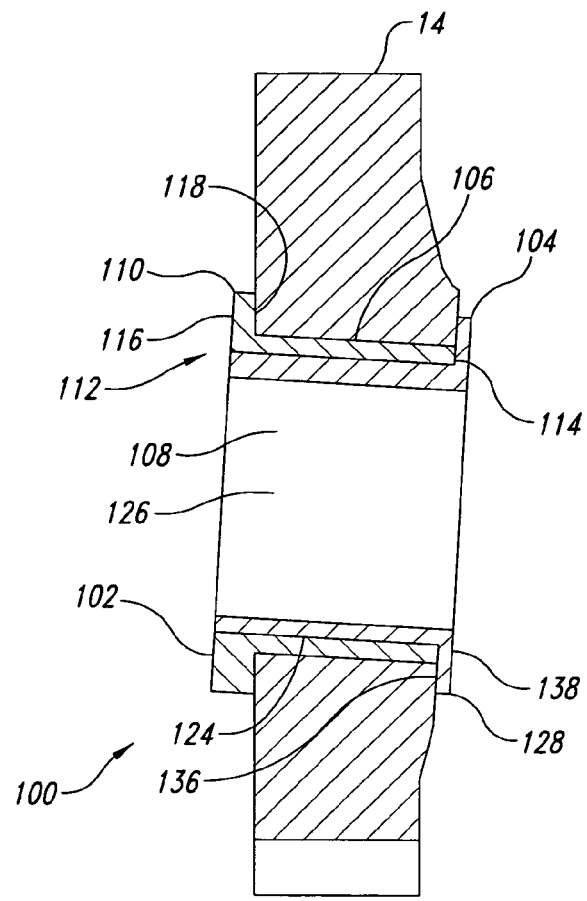
FIG. 12A is a cross-sectional view of the outer bushing and inner eccentric bushing received in an aperture of the lug on the fuselage section of the aircraft according to one illustrated embodiment where an under surface of a flange on the outer bushing is machined or beveled to accommodate off-centered installation.

FIGS. 11 and 12A show an alignment assembly 100 suitable for use with a lug formed from a non-composite material such as metal, or a composite material such as a carbon fiber epoxy. For example, the lugs 14 of the fuselage section 12 may be formed of a metal, for example, aluminum or aluminum alloy, titanium or titanium alloy, steel or steel alloy. Metallic materials typically have fewer design concerns than composite materials. Thus, a less complex alignment assembly may be used, reducing parts count, complexity, weight and/or costs.

One of these alignment assemblies 100 may be used with each of the apertures 18a, 18b in the lug 14 of the fuselage section 12 of the aircraft 10. As illustrated in FIG. 11, the alignment assembly 100 comprises an outer bushing 102 and an inner eccentric bushing 104.

Figure 15:
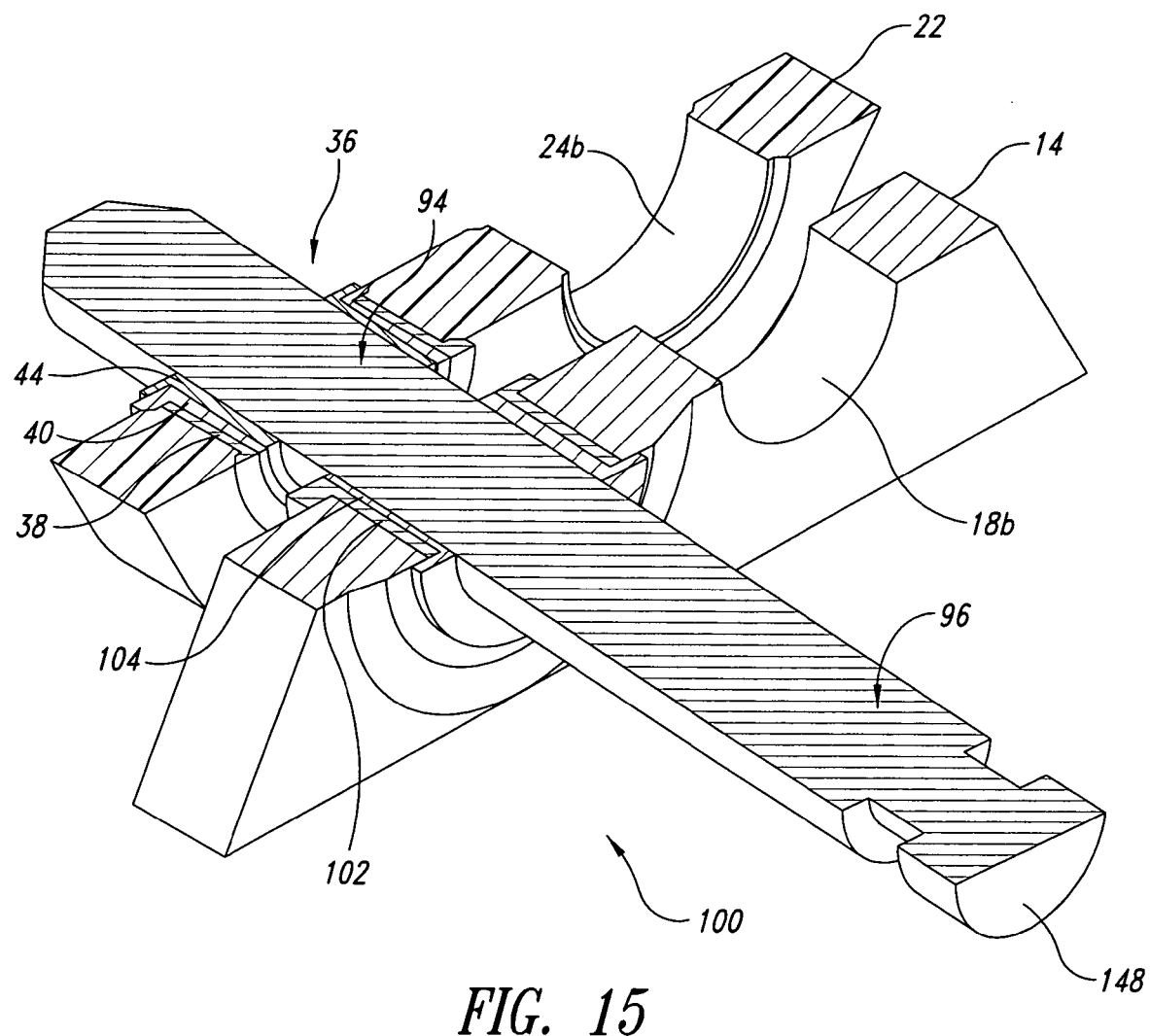
FIG. 15 is the view of FIG. 14A further showing a mandrel received through a passage of an inner eccentric bushing.

The outer bushing 102 comprises a generally tubular body 106 forming a longitudinally extending passage 108, and a radially extending flange 110 formed at a first end 112 of the outer bushing 102, opposed to a second end 114 thereof. The flange 110 includes an upper surface 116 and a lower surface 118. The outer bushing 102 is preferably formed from material suitable for use with cold-expansion techniques, as discussed above and may be secured in the respective apertures 18a, 18b, for example, via cold expansion by use of the mandrel 63 (FIG. 15). While shown as being a single solid integral piece, the outer bushing 102 may, in some embodiments, be formed with a split, for example a longitudinally extending split, or from two or more pieces, for example individual body 106 and flange 110 elements physically coupled to one another.

Optionally, the lower surface 118 of the flange 110 may include a bevel or chamfer (not shown) about a perimeter portion to accommodate a bevel or chamfer (not shown) about the apertures 18a, 18b in which the outer bushing 102 will be received, although such is not necessary.

In one embodiment, the entire lower surface 118 of the flange 110 may be machined or beveled to accommodate the off-center drilling or reaming (note difference in thickness between upper and lower surfaces 116, 118, respectively of flange 110, as the circumference thereof is traversed). Thus, the lower surface 118 of the flange 110 is not perpendicular to the longitudinal axis of the passage 108 of the outer bushing 102.

Figure 12B:
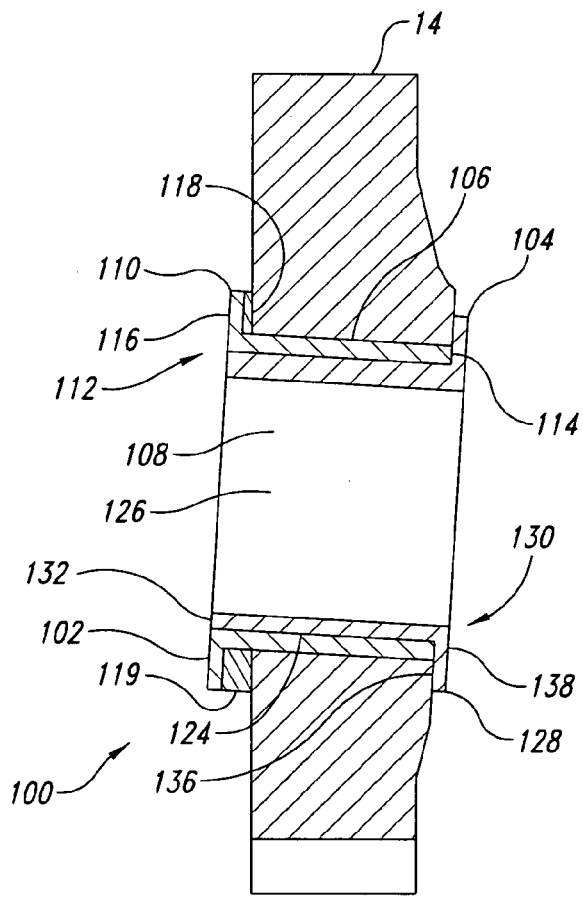
FIG. 12B is a cross-sectional view of the outer bushing and inner eccentric bushing received in an aperture of the lug on the fuselage section of the aircraft according to another illustrated embodiment where a beveled or angled washer is employed in substitution for machining or beveling the under surface of the flange on the outer bushing.

Alternatively, or additionally, the alignment assembly 100 may include a beveled washer 119, which is illustrated in FIG. 12B. The washer 119 may be captured between the outer bushing 102 and the work piece or lug 14. This approach may eliminate the step required to bevel the lower surface 118 of the flange 110 of the outer bushing 102, simplifying manufacturing and consequently reducing costs.

The beveling or machining of the lower surface 118 or washer 119 may occur before the outer bushing 102 is distributed to the manufacturer or assembler of the work piece (e.g., fuselage section 12), as discussed more fully below.

Referring back to FIG. 11, the inner eccentric bushing 104 comprises a generally tubular body 124 forming the longitudinally extending passage 126, and a radially extending flange 128 formed at a first end 130 of the inner eccentric bushing 104, opposed to a second end 132 thereof.

The flange 128 includes a lower surface 136 and upper surface 138. The inner eccentric bushing 104 is preferably formed from material suitable for use with cold-expansion techniques, as discussed above, and may be secured in the respective aperture 18a, 18b, for example, via cold expansion by use of the mandrel 63 (FIG. 15). While shown as being a single solid integral piece, the inner eccentric bushing 104 may be formed with a split, for example a longitudinally extending split, or from two or more pieces, for example individual body 124 and flange 128 elements physically coupled to one another.

The lower surface 136 may optionally include a bevel or chamfer (not shown) about a perimeter portion to accommodate a bevel or chamfer (not shown) about the aperture in which the inner eccentric bushing 104 will be received.

Figure 13:
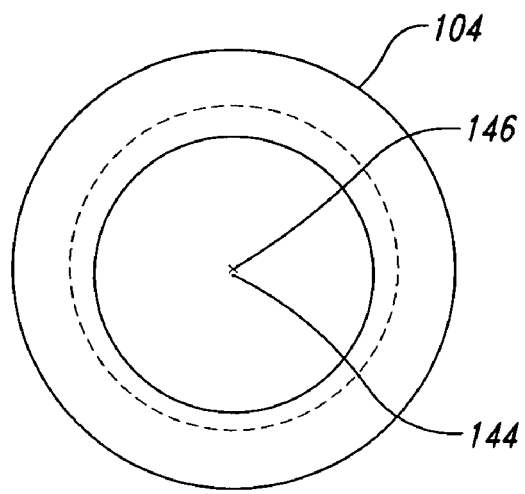
FIG. 13 is a top plan view of the inner eccentric bushing of FIGS. 11 and 12A according to one illustrated embodiment.

In FIG. 12A, the body 124 has an outer diameter sized to be closely (e.g., clearance fit) received by the passage 108 of the outer bushing 102 according to the illustrated embodiment. Briefly referring to FIG. 13, it is seen that a center-line or longitudinal axis 144 of the passage 126 is axially offset from a center-line or longitudinal axis 146 of the outer perimeter of the body 124. Thus, the inner eccentric bushing 104 may be rotated within the outer bushing 102 about a longitudinal axis 146, to achieve alignment with the passages of other eccentric bushings in corresponding lugs in the fuselage section 12, as more fully discussed below. The cold-expansion may be performed after the rotation of the inner eccentric bushing 104, to fix the inner eccentric bushing 104 in the aperture 18a, 18b with the desired rotational orientation.

Figure 12C:
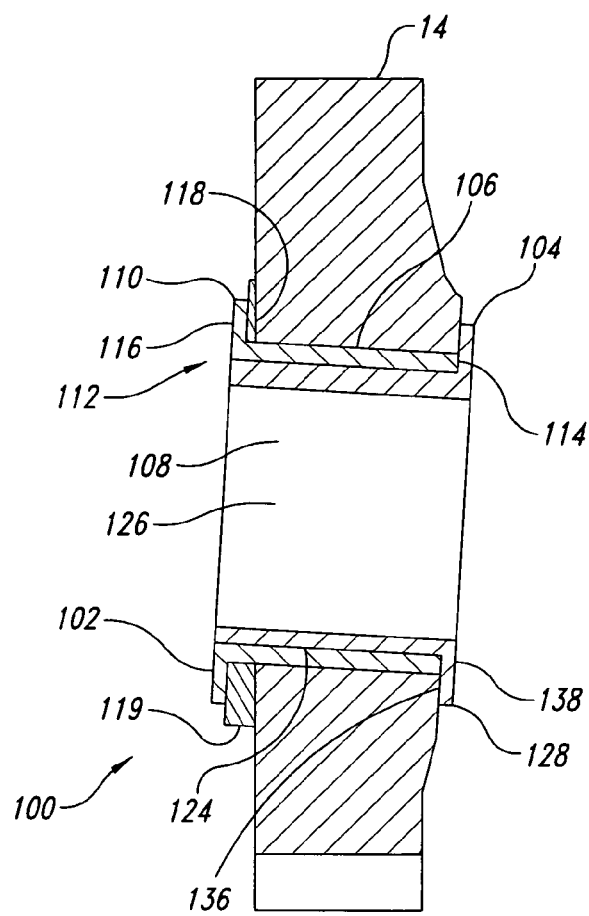
FIG. 12C is a cross-sectional view of another embodiment of the outer bushing and inner eccentric bushing received in an aperture of the lug on the fuselage section of the aircraft where the beveled or angled washer of FIG. 12A has an outer diameter greater than the outer diameter of the flange of the outer bushing.

FIG. 12C illustrates an embodiment nearly identical to the configuration shown in FIG. 12B however, the washer 119 is configured with an outer diameter that is greater than the outer diameter of the outstanding flange 110. One purpose for configuring the washer 119 with a larger outer diameter is assist in conically spreading the load through the joint once a fastener is installed therein (i.e., preloaded joint).

Figure 12D:
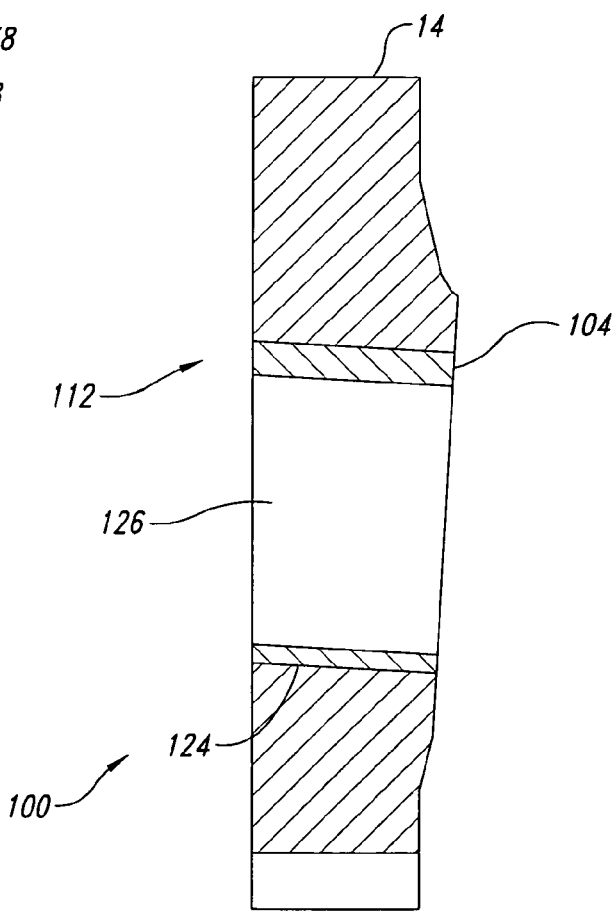
FIG. 12D is a cross-sectional view of another embodiment where a single eccentric bushing is receive in the aperture of the lug on the fuselage section of the aircraft, without additional bushings, and where the eccentric bushing does not have a flange.

FIG. 12D illustrates an embodiment employing the eccentric bushing 104 without an outer bushing 102 in which the eccentric bushing 104 is received flush in the aperture 18a, 18b. In other embodiments the eccentric bushing 104 may extend from the aperture 18a, 18b, and could include a flange.

Figure 14A:
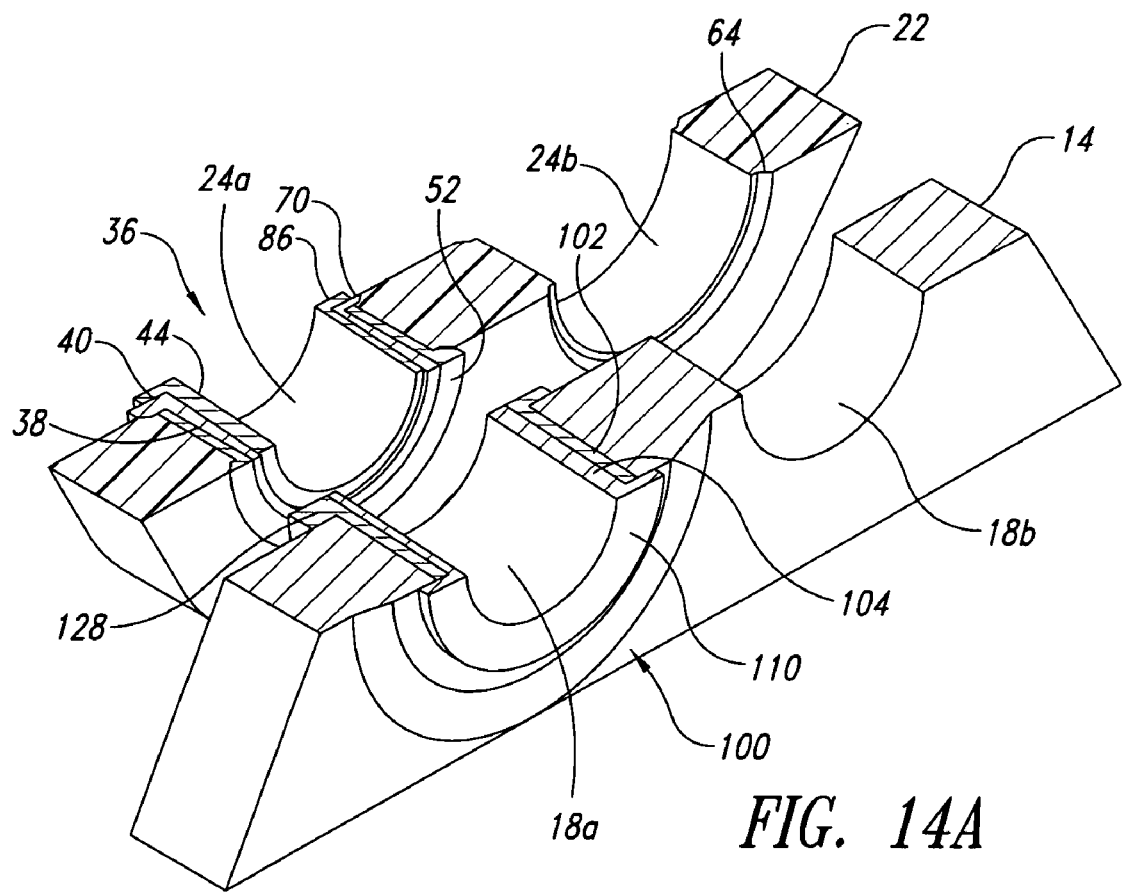
FIG. 14A is a cross-sectional view of an alignment assembly received in an aperture of the lug on the vertical stabilizer and an alignment assembly received in a corresponding aperture of one of the lugs of a corresponding pair of lugs on the fuselage section of the aircraft.

FIG. 14A shows a first alignment assembly 36 received in apertures 18a of the lug 14 of the fuselage section 12 and a second alignment assembly 100 received in the aperture 24a of the lug 22 of the vertical stabilizer 20 according to one illustrated embodiment. The alignment assemblies 36, 100 are shown in only one of the available apertures 18a, 18b, 24a, 24b for purposes of clarity.

Figure 14B:
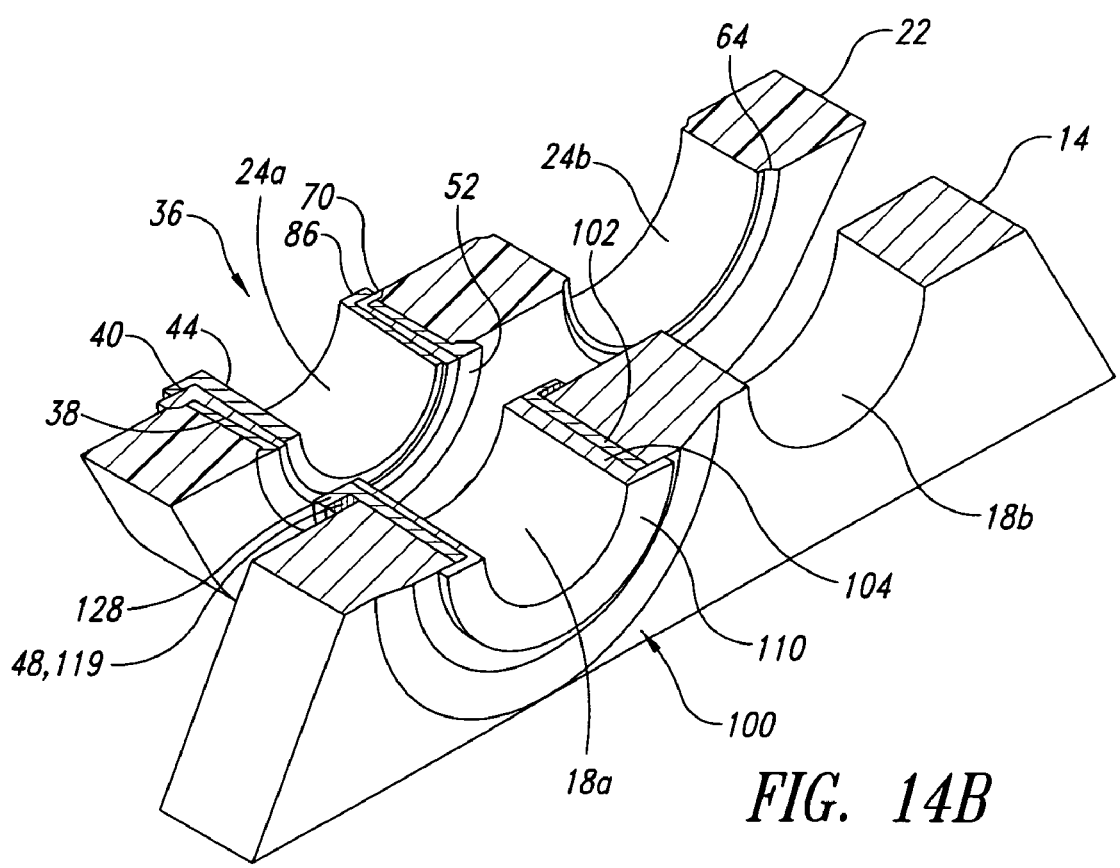
FIG. 14B is a cross-sectional view of another embodiment of an alignment assembly received in an aperture of the lug on the vertical stabilizer and an alignment assembly received in a corresponding aperture of one of the lugs of a corresponding pair of lugs on the fuselage section of the aircraft, where a beveled or angled washer is employed in substitution for machining or beveling the under surface of the flange on the outer nested bushing.

FIG. 14B is nearly identical to the embodiment of FIG. 14A, except a washer 48 or 119 is included in the assembly 100. The configuration and purpose of washers 48, 119 are described in detail above with reference to FIGS. 6 and 12B, respectively.

FIG. 15 shows a mandrel 148 received through the passages of the first and second alignment assemblies 100, 36, respectively. Recall that the mandrel 148 includes a constant diameter section 96, and a radially expanded diameter section 94 that is larger than the constant diameter section 96 and spaced longitudinally therefrom. The mandrel 148 is usable as an alignment tool or "bolt" and also applies a radial expansion force to cold work the eccentric bushings 104, 44 and thus create an interference fit between the bushing 104, 44 and the respective work pieces (e.g., lugs 14, 22).

FIGS. 16A-16D show the relative positions of the passage 126, 84 though the eccentric bushing 104, 44, respectively, as the eccentric bushing 104, 84 rotates about the longitudinal axis 146, 95 (indicated by "X" and extending out of the drawing page). The longitudinal axis 144, 93 (indicated by a point and extending out of the drawing page) of the passage 126, 84 is circumscribed by a circle about the longitudinal axis 146, as the eccentric bushing is rotated 360°.

Figure 16A:
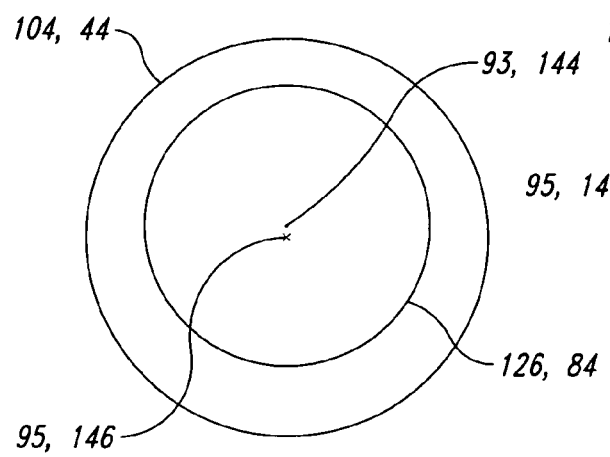
FIGS. 16A-16D are top plan views of an eccentric bushing starting at 0° of rotation, and rotating through 90° in each successive view.
Figure 16B:
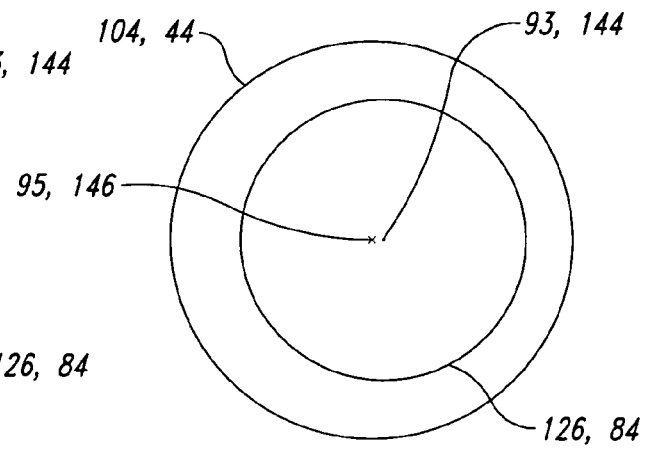
Figure 16C:
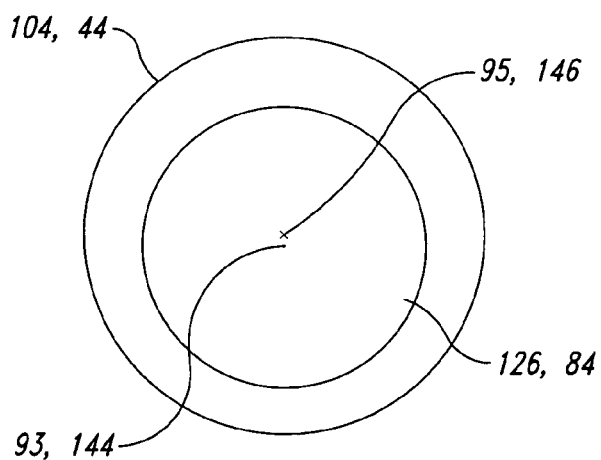
Figure 16D:
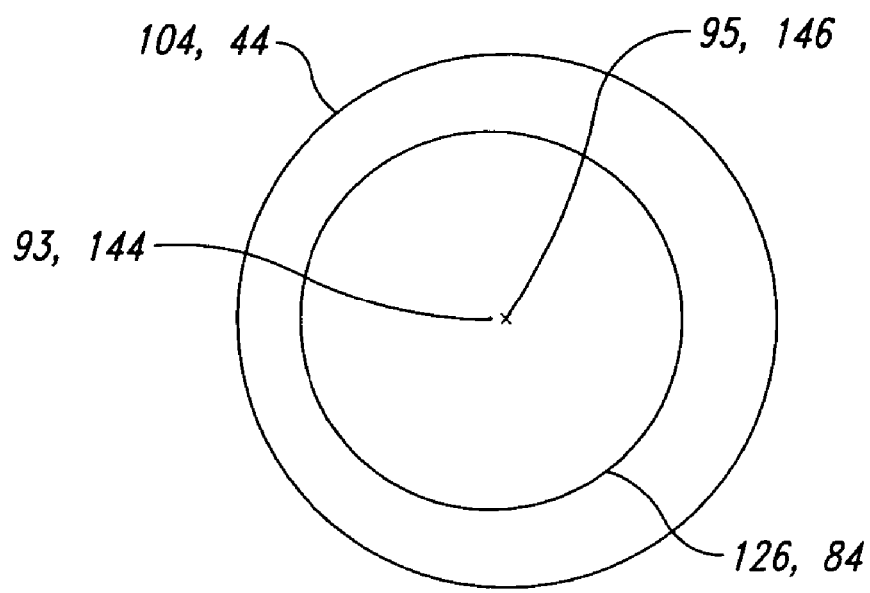

FIG. 16A illustrates a 0° (i.e., 12 o'clock) position, FIG. 16B illustrates a 90° (i.e., three 'clock) position, FIG. 16C illustrates a 180° (i.e., six o'clock) position, and FIG. 16D illustrates a 270° (i.e., nine o'clock) position of the eccentric bushing 104, 44. One or more of the bushings 38, 40, 44, 102, 104 may include one or more reference markings printed, inscribed or otherwise formed thereon to facilitate alignment. For example, one or more of the bushings 38, 40, 44, 102, 104 may include a machined flat on the circumference of a flange thereof, which may cooperate with a complimentary flat on an alignment tool (not shown).

Figure 16E:
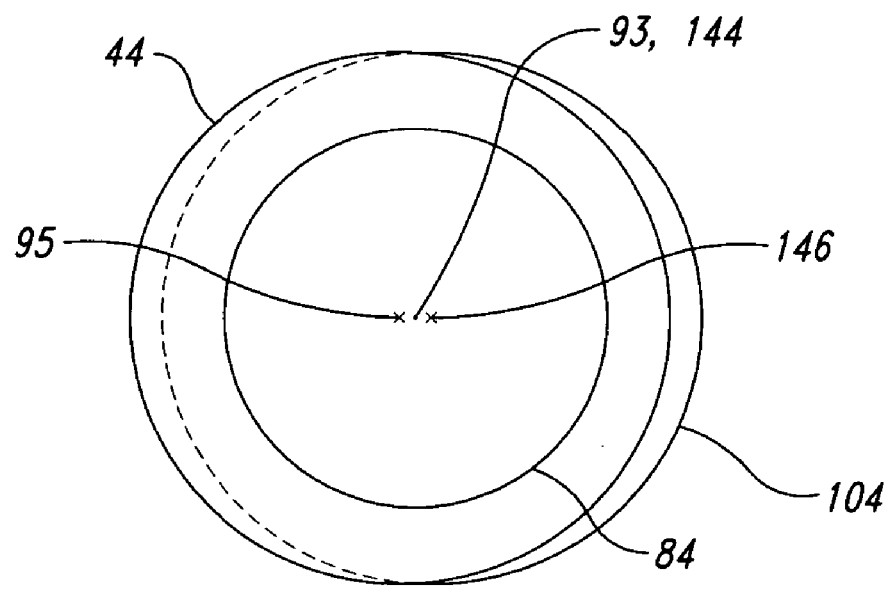
FIG. 16E is a top plan view of two eccentric bushings rotated to approximately align the passages therethrough according to one illustrated embodiment.

FIG. 16E shows the eccentric bushing 44 of the alignment assembly 36 received in one of the apertures 18a, 18b of one lug 14 of one of the pairs of lugs 14 on the fuselage section 12. The eccentric bushing 44 includes the passage 84 having longitudinal axis 93, and rotates about longitudinal axis 95 as illustrated in FIGS. 16A-16D. FIG. 16E also shows the inner eccentric bushing 104 of alignment assembly 100 spaced relatively behind the eccentric bushing 44 in the view of FIG. 16E. The inner eccentric bushing 104 includes the passage 126 having longitudinal axis 144, and rotates about longitudinal axis 146, as illustrated in FIGS. 16A-16D. Both the eccentric bushings 44, 104 are rotated about their respective longitudinal axes 95, 146 to align their passages 84, 126, respectively. While not illustrated in FIG. 16E for the sake of clarity, a third eccentric bushing may received in corresponding aperture 18a of the other lug 14 of the pair of lugs 14, and rotated about a longitudinal axes to align its passage with the passages 84, 126 of the eccentric bushings 44, 104 illustrated in FIG. 16E. Likewise, some embodiments may employ additional eccentric bushings, or fewer eccentric bushings as suits the particular application.

Figure 17:
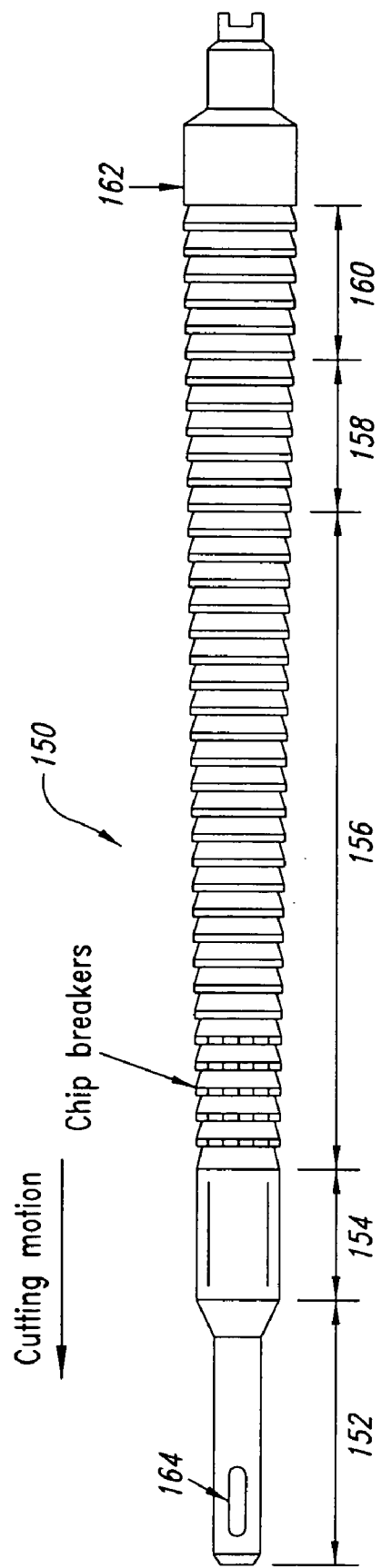
FIG. 17 is a side elevational view of a broach.

FIG. 17 shows a broach 150, suitable for performing a final broaching of the eccentric bushings 104, 44, according to one illustrated embodiment. The broach 150 comprises a pull end section 152, a front pilot section 154, roughing teeth section 156, semi-finishing teeth section 158, finishing teeth section 160, and a rear pilot section 162. The pull end section 152 includes a slot 164 for engagement by a puller unit 166 (FIGS. 18-20) or other tool. The front pilot section 154 has a diameter sized to be closely (e.g., clearance fit) received through the passages 126, 84 of the eccentric bushings 104, 44. The roughing teeth section 156 may include chip breakers, and generally larger teeth for removing material from the eccentric bushings 104, 44. The semi-finishing teeth 158 section generally comprises teeth smaller than the roughing teeth section 156, to smooth the passages 126, 84 through the eccentric bushings 104, 44 to approximately the desired finished diameter. The finishing teeth section 160 generally comprises the finest teeth, smaller than the semi-finishing teeth section 158, to smooth the passages 126, 84 of the eccentric bushings 104, 44 to the desired finished diameter. The rear pilot section 162 has a diameter equal to the desired finished diameter, permitting easy determination of whether the passages 126, 84 of the eccentric bushings 104, 44 are within the defined tolerance of the desired diameter.

FIG. 18 shows the broach 150 of FIG. 17 and a puller unit 166, positioned just prior to insertion of the broach through the apertures in the eccentric bushings 104, 44. The puller unit 166 is typically a hydraulic or pneumatic device that exerts an axial force on the broach 150 to move the broach 150 longitudinally through the work piece. Puller units 166 are disclosed in the various U.S. Patents and U.S. Patent applications recited above. Alternatively, a pusher unit may be employed.

FIG. 19 shows the broach 150 received through the eccentric bushings 104, 44 and coupled to the puller unit 166, prior to operation of the puller unit 166.

Figure 20:
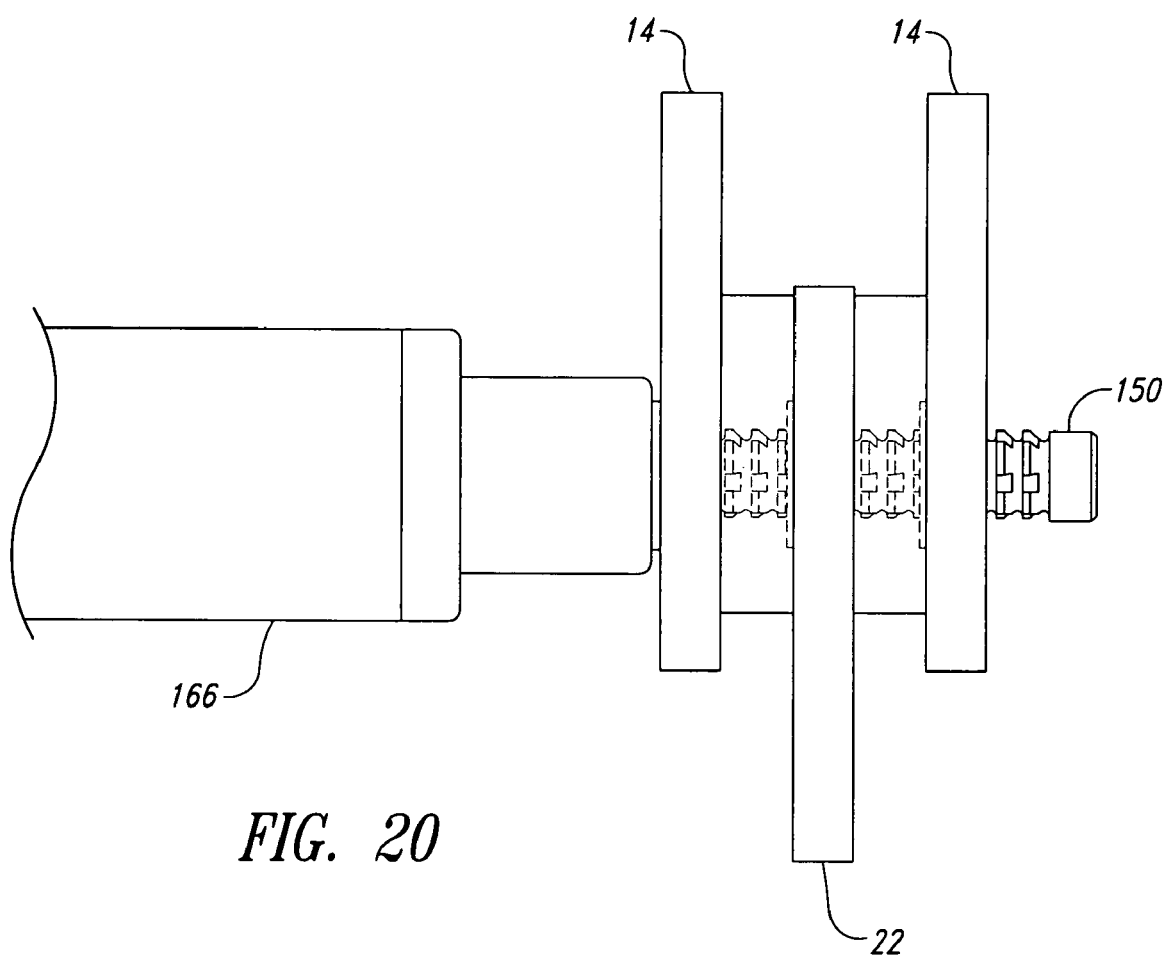
FIG. 20 is a side elevational view of the broach pulled partially through the bushings and the lugs by the puller unit.

FIG. 20 shows the broach 150 received through the eccentric bushings 104, 44 and coupled to the puller unit 166, during operation of the puller unit 166. Advantageously, the same puller unit 166 may be used for both cold work expansion and for broaching of the bushings 104, 44.

Figure 21:
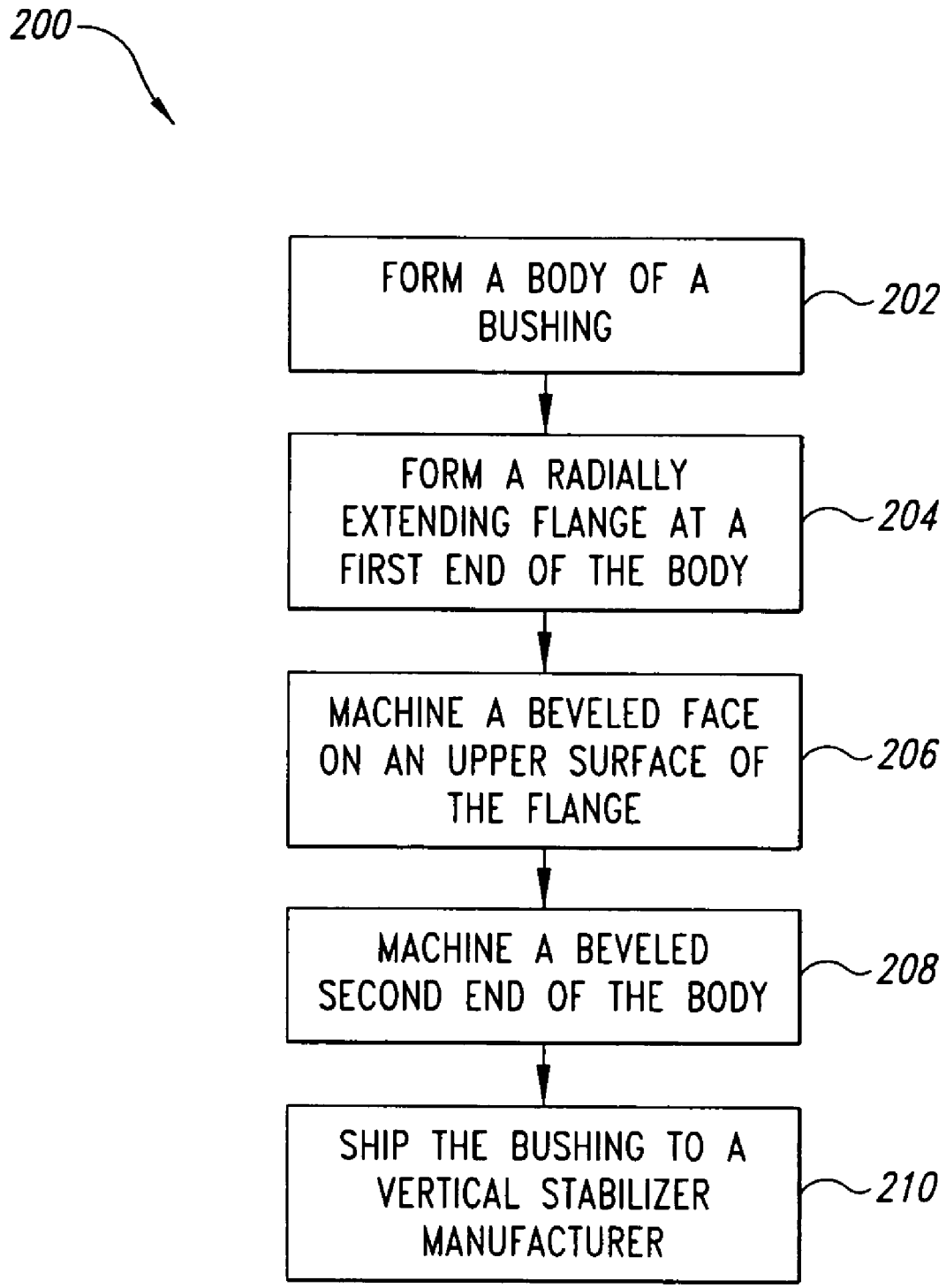
FIG. 21 is a flow diagram showing a method of forming bushings of an alignment assembly suitable for use with a composite work piece according to one illustrated embodiment.

FIG. 21 shows an illustrated method 200 of forming the bushings 38, 40, 44 of the alignment assembly 36 according to one illustrated embodiment. At 202, a body 50, 68, 82 of the bushing 38, 40, 44, respectively, is formed, for example, via machining, extrusion or casting. At 204, a radially extending flange 52, 70, 86 is formed at a first end 54, 72, 88, of the body 50, 68, 82 of the bushing 38, 40, 44, respectively. At 206, a beveled face is machined on an upper surface 58, 78, 87 of the flange 52, 70, 86. At 208, the second end 56, 74, 90 of the bushing 38, 40, 44 is beveled. At 210, the bushing 38, 40, 44 is shipped, for example to a manufacturer or assembler of the vertical stabilizer 20.

Figure 22A:
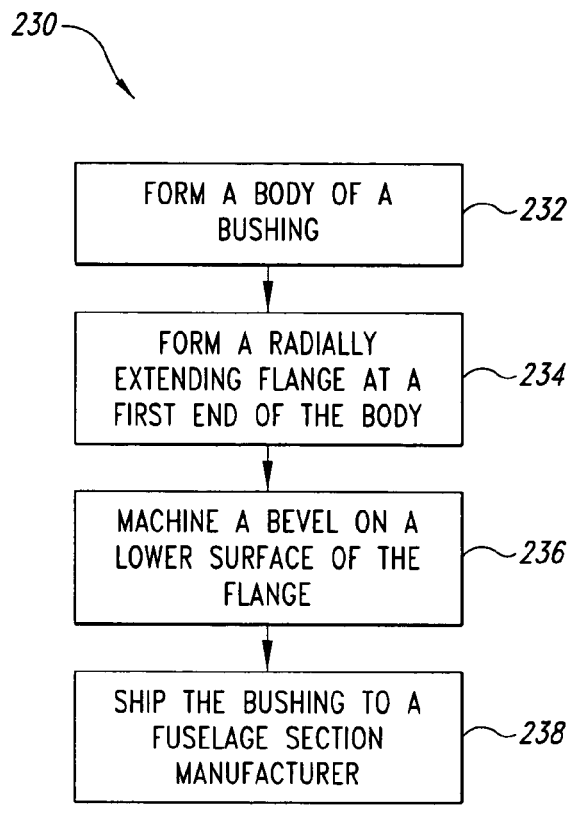
FIG. 22A is a flow diagram showing a method of forming an outer bushing of an alignment assembly suitable for use with a non-composite work piece according to one illustrated embodiment.

FIG. 22A shows a method 230 of forming the outer bushing 102 of the alignment assembly 100 according to one illustrated embodiment. At 232, the body 106 of the outer bushing 102 is formed, for example, via machining, extrusion or casting. At 234, a radially extending flange 110 is formed at a first end 112 of the outer bushing 102. At 236, a lower surface 118 of the flange 110 is machined or beveled. At 238, the bushing 102 is shipped, for example to the manufacturer or assembler of the fuselage section 12.

Figure 22B:
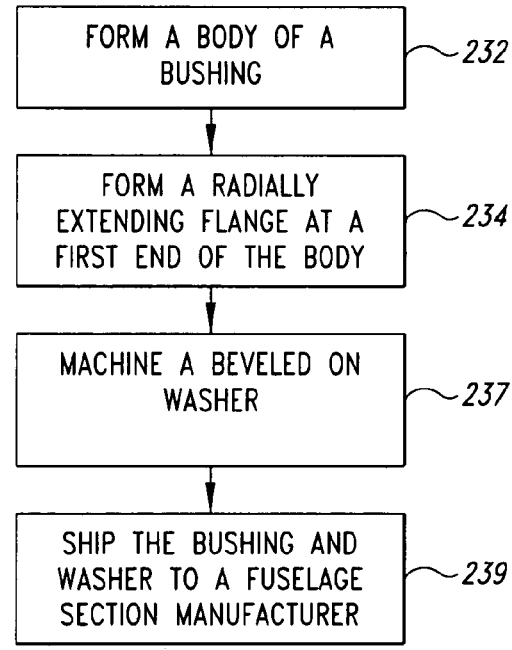
FIG. 22B is a flow diagram showing a method of forming an outer bushing of an alignment assembly suitable and a beveled or angled washer for use with a non-composite work piece according to one illustrated embodiment.

FIG. 22B shows a method 231 of forming the outer bushing 102 and beveled or angled washer 119 of the alignment assembly 100 according to one illustrated embodiment. At 232, the body 106 of the outer bushing 102 is formed, for example, via extrusion or casting. At 234, a radially extending flange 110 is formed at a first end 112 of the outer bushing 102 to complete the forming of the outer bushing 102. At 237, the beveled or angled washer 119 is formed such that the thickness of the washer 119 is circumferentially varied to account for misalignment of the assembly 100. At 239, the bushing 102 and washer 119 are shipped, for example to the manufacturer or assembler of the fuselage section 12.

Figure 23A:
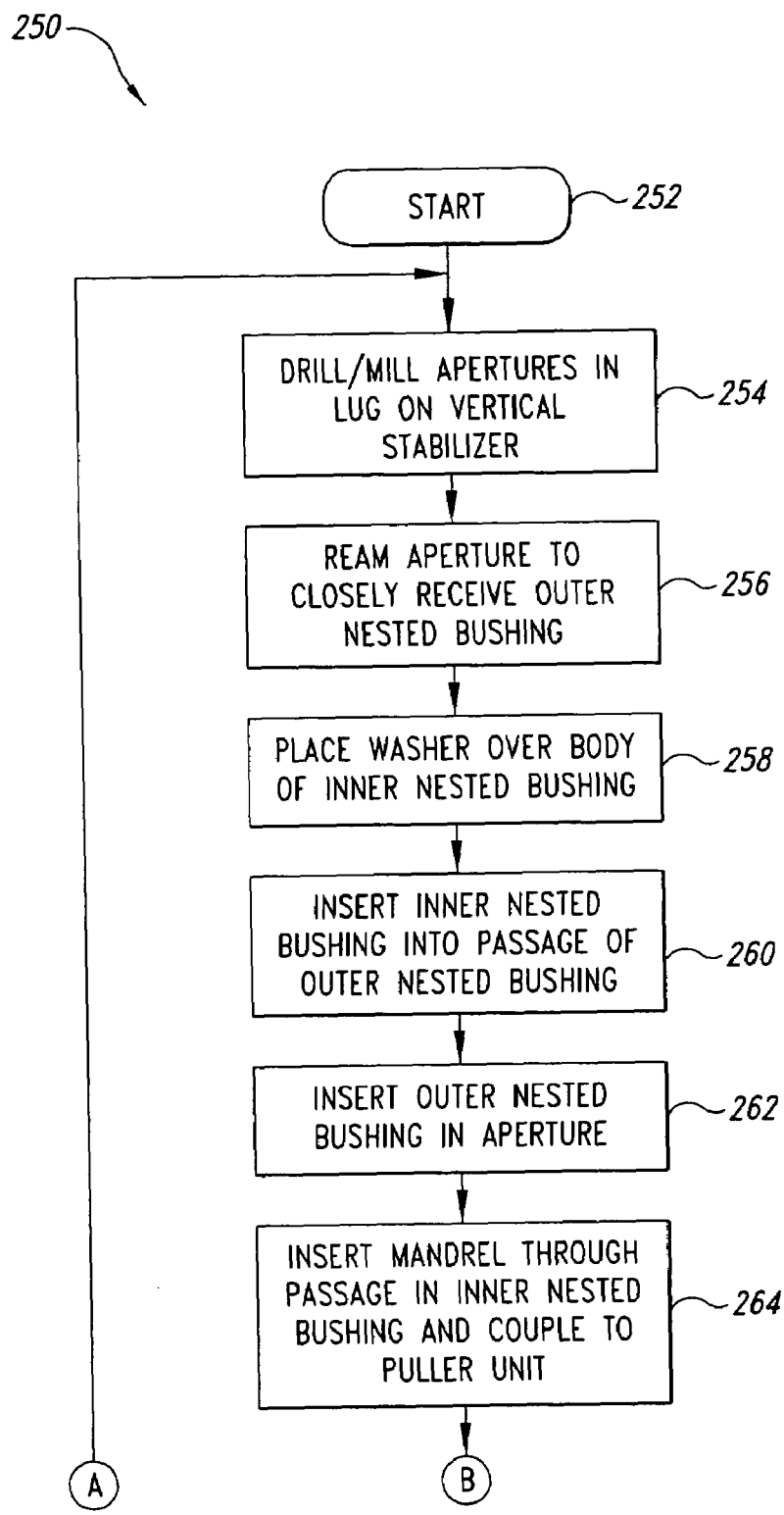
FIGS. 23A and 23B are a flow diagram showing a method of installing the alignment assembly in a composite work piece according to one illustrated embodiment.
Figure 23B:
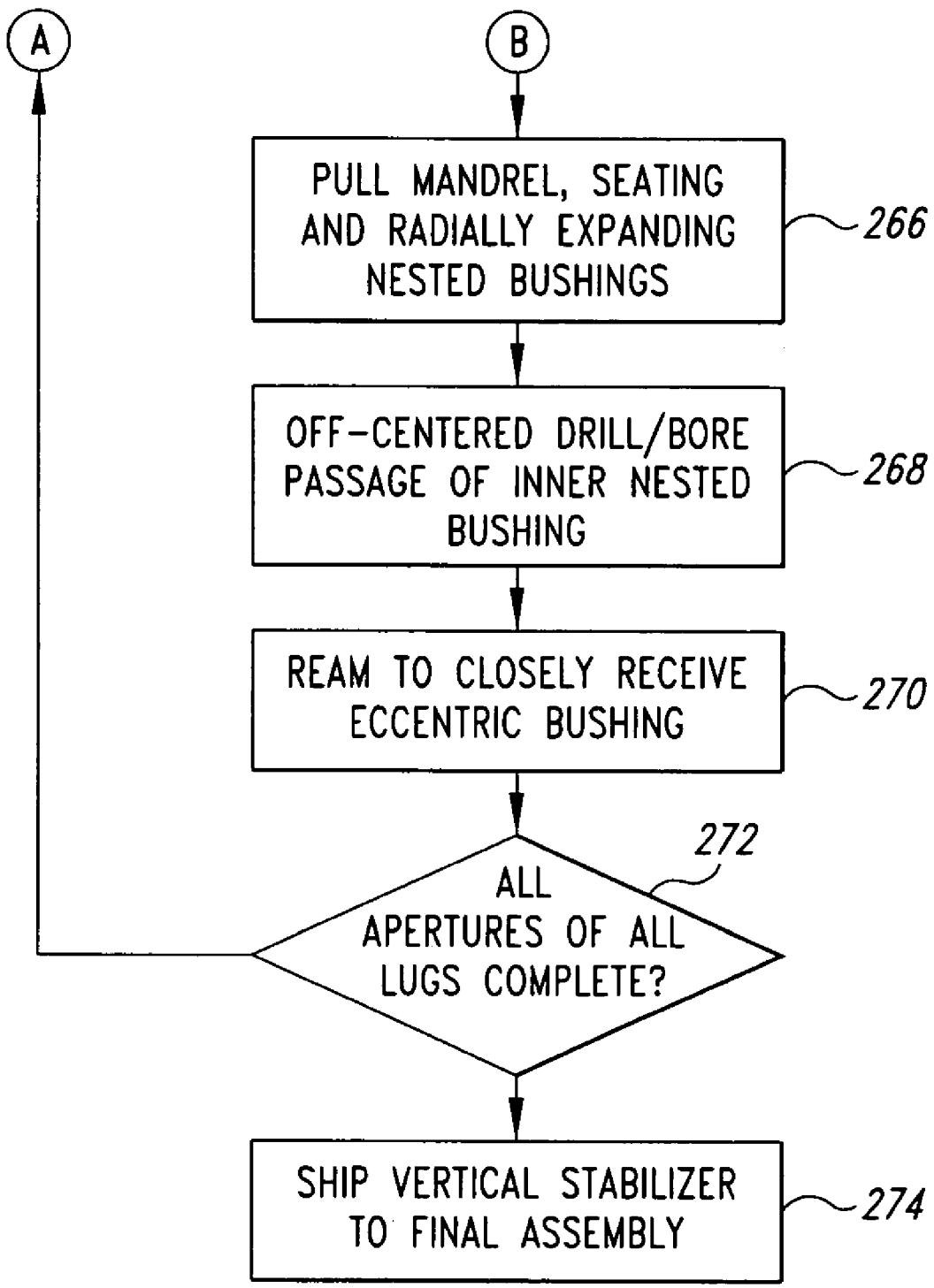

FIGS. 23A and 23B show a method 250 of installing the alignment assembly 36 in the composite lugs 22 according to one illustrated embodiment, starting at 252. At 254, the apertures 24a, 24b in lugs 22 are drilled or milled. At 256, the apertures 24a, 24b are reamed to closely receive the outer nested bushing 38. At 258, a washer is placed over the body 50 of the outer nested bushing 38. At 260, the inner nested bushing 40 is inserted into the passage 42 of the outer nested bushing 38. At 262, the outer nested bushing 38 along with the inner nested bushing 40 are inserted into the aperture 24a, 24b.

At 264, the mandrel 63 is inserted through the passage 46 of the inner nested bushing 40, and coupled to the puller unit 166. At 266, the puller unit 166 is operated to pull the mandrel 63 through the passage 46, radially expanding the outer and inner nested bushings 38, 40, respectively. Such radial expansion secures the nested bushings 38, 40 in the aperture 24a, 24b.

At 268, the passage 46 of the inner nested bushing 40 is drilled or bored at an angle (i.e., off-centered). At 270, the passage 46 is reamed to closely receive the eccentric bushing 44. At 272 the above described process repeats until all apertures 24a, 24b of all lugs 22 are equipped with outer and inner nested bushings 38, 40. At 274 the vertical stabilizer is shipped to final assembly.

Figure 24:
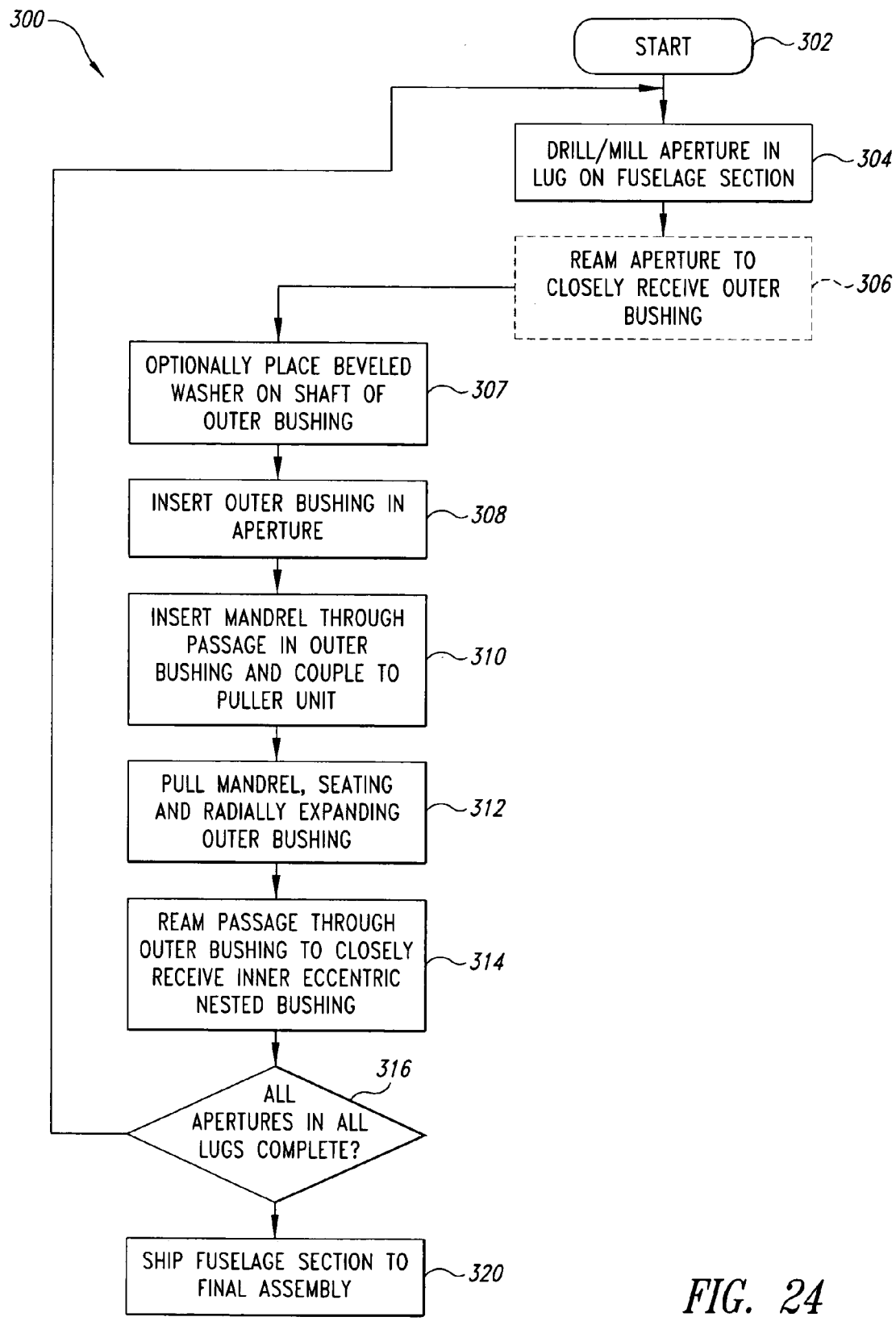
FIG. 24 is a flow diagram showing a method of installing the alignment assembly in a non-composite work piece according to one illustrated embodiment.

FIG. 24 shows a method 300 of preparing lugs 14 according to one illustrated embodiment starting at 302. At 304, the apertures 18a, 18b are drilled or milled. At 306, the apertures 18a, 18b are reamed to closely receive the outer bushing 102. At 308, the outer bushing 102 is inserted in the aperture 18a, 18b. At 310, the mandrel 63 is received through the passage 108 of the outer bushing 102 and coupled to a puller unit 166. At 312, the puller unit 166 is operated to pull the mandrel 63, seating and radially expanding the outer bushing 102. Radial expansion secures the outer bushing 102 in the aperture 18a, 18b.

At 314, the passage 108 is reamed to closely receive the inner eccentric bushing 104. At 316, the above described process is repeated until all apertures 18a, 18b of all lugs 14 are fitted with the outer nested bushing 102. At 320, the fuselage section 12 is shipped to final assembly.

Figure 25A:
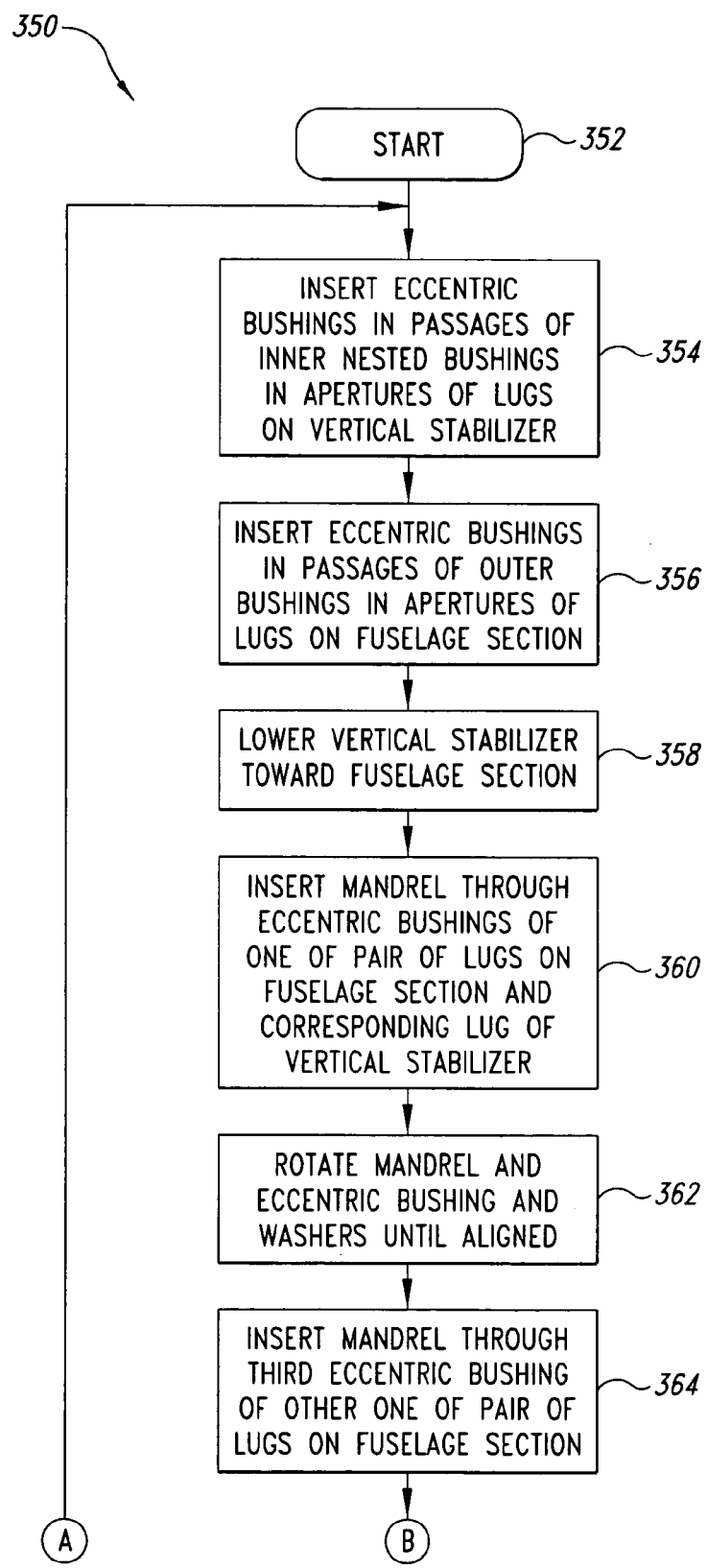
FIGS. 25A and 25B are a flow diagram showing a method of aligning the vertical stabilizer and the fuselage section using the alignment assemblies according to one illustrated embodiment.
Figure 25B:
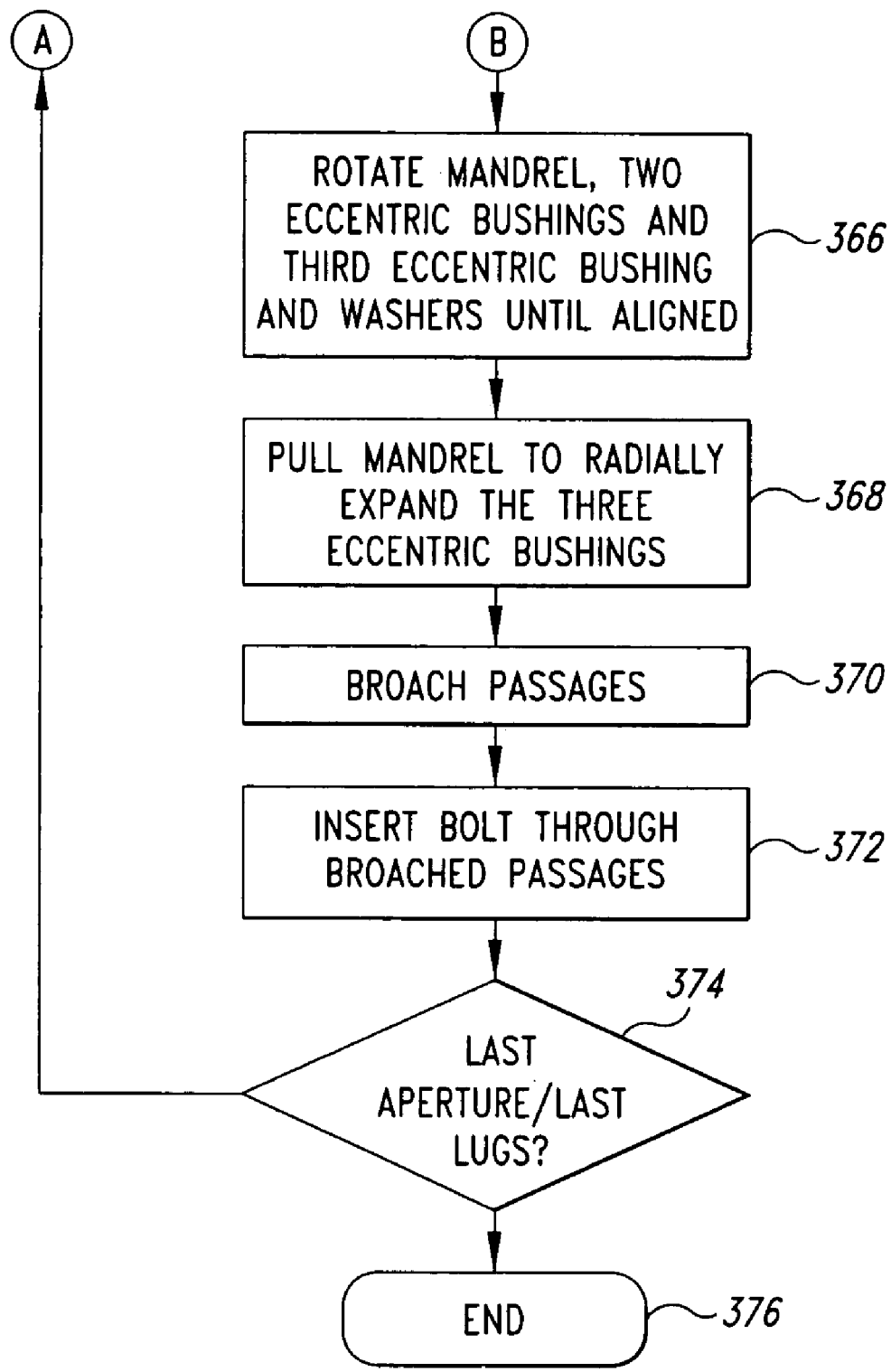

FIGS. 25A and 25B show a method 350 of aligning the vertical stabilizer 20 and fuselage section 12 during final assembly using the alignment assemblies 36, 100, according to one illustrated embodiment, starting at 352. While the method 350 is generally described in terms of a composite lug 22 carried by the vertical stabilizer 20 being received between a pair of metallic lugs 14 carried by the fuselage section 12, the principals of method 350 may be employed with other structures, and with a lesser or greater number of lugs or other coupling structures.

At 354, the eccentric bushings 44 is inserted in the passage 46 of the inner nested bushing 40. At 356, the inner eccentric bushing 104 is inserted in the passage 108 of the outer bushing 102. Acts 354 and 356 may be performed in the opposite order to that set out in the Figure. At 358, the vertical stabilizer 20 is lowered towards the fuselage section 14.

At 360, the mandrel 148 is inserted through the passages 46, 108 of the eccentric bushings 44, 104, respectively, for one lug 14 of the pair of lugs 14 on the fuselage section 12, and corresponding lug 22 of the vertical stabilizer 20. At 362, the mandrel 148, eccentric bushings 44, 104, and washers if any, are rotated until aligned to form a relatively smooth passage therethrough.

At 364, the mandrel 148 is further inserted through the eccentric bushing 44 of the other lug 14 of the pair of lugs 14 on the fuselage section 12. At 366, the mandrel 148, along with the first two aligned eccentric bushings 44, 104, and the additional eccentric bushing 44, and washers if any, are rotated until aligned to form a relatively smooth passage therethrough. At 368, the puller unit is operated to pull the mandrel 148, radially expanding the three aligned eccentric bushings 44, 104, 44. The eccentric bushings 44, 104, 44 are secured in the inner nested bushing 40 of one lug 14 of the pair, the outer bushing 102 of the composite lug 22, and inner nested bushing 40 of the other lug 14 of the pair, respectively. At 370, the passages 84, 126, 84 in the eccentric bushings 44, 104, 44 are broached to securely receive a bolt therethrough. At 372, a bolt is inserted through the broached passages 84, 126, 84. The process repeats at 374 until the last aperture 18a, 18b, 24a, 24b of the last lug 14, 22 has been successfully secured, and terminates at 376.

The approach taught herein may provide simple, fast, and efficient alignment of misaligned apertures such as holes. The approach taught herein may allow easy replacement and/or repair, requiring only the eccentric bushing to be replaced in case of damage. The approach taught herein may achieve enhanced fatigue resistant benefits through cold working of the apertures in the work piece, and may also achieve enhanced torque and push-out properties and providing higher dynamic load capabilities than standard aluminum lugs. Further, the approach taught herein may reduce structural damage resulting from lightning strikes. The outer bushings remain in the work piece during the entire manufacture process, thereby protecting the more delicate portions of the work piece. The approach taught herein may provide protection against corrosion during manufacture and repair. The teachings may also eliminate a production step, for example, the re-drilling the bushings in the lugs 14 of the fuselage section 12 in order to correct the alignment and size to match that of the lugs 22 of the vertical stabilizer 20.

While alignment assembly 36 is generally described above with respect to use in composite materials, it is also suitable for use in non-composite materials. While the alignment assembly 100 is generally described with respect to use in non-composite materials, it may also be suitable for use with composite materials.

Although specific embodiments of and examples for the alignment assemblies and eccentric bushings are described herein for illustrative purposes, various equivalent modifications can be made without departing from the spirit and scope of the invention, as will be recognized by those skilled in the relevant art. The teachings provided herein of the invention can be applied to other alignment assemblies, not necessarily the exemplary two and three bushing alignment assemblies generally described above. Techniques other than cold working radial expansion may be employed for securing the bushings in the respective apertures. Some embodiments may employ bushings that are not necessarily nested.

While generally discussed in terms of lugs, a fuselage section and vertical stabilizer of an aircraft, the teachings herein may be applied to any variety of other work pieces to be assembled, combined, attached, coupled or otherwise joined. For example, the teachings may be applied to horizontal fins or stabilizers, or may be applied to stabilizers that extend in directions that are not horizontal to the aircraft coordinate system (e.g., V-tails). Further, while discussed with reference to a composite work piece (e.g., lug 22) and a pair of metal work pieces (pair of lugs 14), the work pieces may all be formed of a composite material, or all formed of a metal material. Additionally, or alternatively, the work pieces may be formed of comprise materials other than metals or composites. While broaching is discussed, some embodiments may employ reaming, milling, turning, planning or other manufacturing operations depending on the particular materials, tolerances and desired shapes.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to U.S. Pat. Nos. 4,423,619; 4,425,780; 4,471,643; 4,557,033; 4,809,420; 4,864,732; 4,885,829; 4,934,170; 5,083,363; 5,096,349; 5,103,548; 5,127,254; 5,218,584; 5,245,743; 5,305,627; 5,341,559; 5,380,136; 5,405,228; 5,433,100; 5,468,104; 6,007,010; and 6,183,180 are incorporated herein by reference, in their entirety. Aspects of the invention can be modified, if necessary, to employ systems, circuits and concepts of the various patents, applications and publications to provide yet further embodiments of the invention.

For example, one or more bushings may include splines, ridges, or other surface irregularities that may enhance torque resistance. Bushings may be lubricated, for example, using a baked on lubricant. These and other changes can be made to the invention in light of the above-detailed description. In general, in the following claims, the terms used should not be construed to limit the invention to the specific embodiments disclosed in the specification and the claims, but should be construed to include all alignment assemblies employing eccentric bushings and methods employing the same operate in accordance with the claims. Accordingly, the invention is not limited by the disclosure, but instead its scope is to be determined entirely by the following claims.

The invention claimed is:

1. An alignment assembly, comprising:
an eccentric bushing comprising a generally tubular body formed about a body longitudinal axis, the body having a first end and a second end opposed to the first end, the body of the eccentric bushing forming a passage having a passage longitudinal axis laterally offset from the body longitudinal axis, the eccentric bushing having a radially extending flange proximate the first end of the body;
an inner bushing comprising a generally tubular body having a first end and a second end opposed to the first end of the inner bushing, the body of the inner bushing having an outer surface defining a body longitudinal axis of the inner bushing and an inner surface forming a passage sized to closely receive the body of the eccentric bushing, and the inner bushing having a radially extending flange proximate the first end of the body, with an upper surface that is not perpendicular to the body longitudinal axis of the inner bushing; and
an outer bushing comprising a generally tubular body formed about a body longitudinal axis, having a first end and a second end opposed to the first end, the body of the outer bushing forming a passage sized to closely receive the body of the inner bushing, the outer bushing having a radially extending flange proximate the first end of the body, with an upper surface that is not perpendicular to the body longitudinal axis of the outer bushing.

2. The alignment assembly of claim 1 wherein the radially extending flange of the eccentric bushing includes a beveled surface.

3. The alignment assembly of claim 1 wherein the radially extending flange of the inner bushing includes a longitudinal thickness that varies circumferentially.

4. The alignment assembly of claim 1, further comprising: a washer.

5. The alignment assembly of claim 4 wherein the washer is located between the radially extending flange of the inner bushing and the second end of the outer bushing.

6. The alignment assembly of claim 4 wherein the washer includes a longitudinal thickness that varies circumferentially.

7. The alignment assembly of claim 1 wherein at least one of the respective bushings is formed with a split oriented substantially parallel to the respective body longitudinal axis of the bushing.

8. The alignment assembly of claim 1, wherein the passage of the eccentric bushing is centered about the passage longitudinal axis of the eccentric bushing throughout a longitudinal length of the tubular body of the eccentric bushing.

9. An alignment system to facilitate a coupling between at least a first and a second work piece, the alignment system comprising:
a first alignment assembly comprising:
a first eccentric bushing comprising a generally tubular body formed about a body longitudinal axis, the body having a first end and a second end opposed to the first end, the body of the eccentric bushing forming a passage having a passage longitudinal axis laterally offset from the body longitudinal axis, the eccentric bushing having a radially extending flange proximate the first end of the body;
a first inner bushing comprising a generally tubular body having a first end and a second end opposed to the first end, the body of the first inner bushing forming a passage sized to closely receive the body of the first eccentric bushing, and the first inner bushing having a radially extending flange proximate the first end of the body, an upper surface of the flange beveled to accommodate an off-centered machining of the passage of the first inner bushing; and
a first outer bushing comprising a generally tubular body having a first end and a second end opposed to the first end, the body of the first outer bushing forming a passage sized to closely receive the body of the first inner bushing, the first outer bushing having a radially extending flange proximate the first end of the body, an upper surface of the flange beveled to accommodate an off-centered machining of the passage of the first outer bushing, where the body of the first out bushing is received in an aperture formed in the first work piece secured therein via cold work expansion, the body of the first inner bushing is received in the passage of the first outer bushing and secured therein via cold work expansion, and the body of the eccentric bushing is received in the passage of the first inner bushing and secured therein via cold work expansion;
a second alignment assembly comprising:
a second eccentric bushing comprising a generally tubular body formed about a body longitudinal axis, the body having a first end and a second end opposed to the first end, the body of the second eccentric bushing forming a passage having a passage longitudinal axis laterally offset from the body longitudinal axis, the second eccentric bushing having a radially extending flange proximate the first end of the body;
a second inner bushing comprising a generally tubular body having a first end and a second end opposed to the first end, the body of the second inner bushing forming a passage sized to closely receive the body of the second eccentric bushing, and the second inner bushing having a radially extending flange proximate the first end of the body, an upper surface of the flange beveled to accommodate an off-centered machining of the passage of the second inner bushing; and
a second outer bushing comprising a generally tubular body having a first end and a second end opposed to the first end, the body of the second outer bushing forming a passage sized to closely receive the body of the second inner bushing, the second outer bushing having a radially extending flange proximate the first end of the body, an upper surface of the flange beveled to accommodate an off-centered machining of the passage of the second outer bushing, where the body of the second out bushing is received in an aperture formed in the second work piece secured therein via cold work expansion, the body of the second inner bushing is received in the passage of the second outer bushing and secured therein via cold work expansion, and the body of the eccentric bushing is received in the passage of the second inner bushing and secured therein via cold work expansion, and wherein at least one of the first and the second eccentric bushings is rotated about the respective body longitudinal axis of the at least one eccentric bushing to substantially align the passages of the first and the second eccentric bushings.

10. The alignment system of claim 9, further comprising:
a third alignment assembly comprising:
   a third eccentric bushing comprising a generally tubular body formed about a body longitudinal axis, the body of the third eccentric bushing having a first end and a second end opposed to the first end, the body of the third eccentric bushing forming a passage having a passage longitudinal axis laterally offset from the body longitudinal axis, the third eccentric bushing having a radially extending flange proximate the first end of the body; and
   an outer bushing comprising a generally tubular body having a first end and a second end opposed to the first end, the body of the outer bushing forming a passage sized to closely receive the body of the third eccentric bushing, and the outer bushing having a radially extending flange proximate the first end of the body, where the body of the outer bushing is received in an aperture formed in a third work piece secured therein via cold work expansion, the body of the third eccentric bushing is received in the passage of the outer bushing and secured therein via cold work expansion;
   wherein the third eccentric bushing is rotated about the body longitudinal axis to substantially align the body longitudinal axis of the third eccentric bushing with the body longitudinal axis of one of the first or second eccentric bushings.

11. The alignment system of claim 9 wherein the radially extending flange of at least one of the eccentric bushings includes a beveled surface.

12. The alignment system of claim 9 wherein the radially extending flange of at least one of the inner bushings includes a longitudinal thickness that varies circumferentially.

13. The alignment system of claim 9, further comprising: at least one washer to fill a gap in the system.

14. The alignment system of claim 13 wherein the at least one washer includes a longitudinal thickness that varies circumferentially.

15. The alignment system of claim 9 wherein at least one of the respective bushings is formed with a split oriented substantially parallel to the respective body longitudinal axis of the bushing.

16. The alignment system of claim 9, wherein the passage of the first eccentric bushing is centered about the passage longitudinal axis of the first eccentric bushing throughout a longitudinal length of the tubular body of the first eccentric bushing.

17. A method of aligning coupling structures on at least a first and a second work piece, the method comprising:
   locating a first outer bushing having a passage in an aperture formed in the first work piece;
   locating a first inner bushing having a passage in the passage of the first outer bushing;
   securing the first outer bushing and the first inner bushing in the aperture and the passage, respectively, via cold work expansion;
   locating a second outer bushing having a passage in an aperture formed in the second work piece;
   locating a second inner bushing in the passage of the second outer bushing;
   securing the second outer bushing and the second inner bushing in the aperture and the passage, respectively, via cold work expansion;
   locating a first eccentric bushing having a passage in the passage of the first inner bushing, the first eccentric bushing having a first end, a second end opposed to the first end, an inner circumference formed about a first axis, and an outer circumference formed about a second axis laterally offset from the first axis;
   locating a second eccentric bushing having a passage in the passage of the second inner bushing;
   rotating at least one of the first and the second eccentric bushing to approximately align the passages thereof; and
   securing the first eccentric bushing with the first inner bushing and securing the second eccentric bushing with the second inner bushing via cold work expansion and after the respective eccentric bushing passages have been approximately aligned.

18. The method of claim 17 for further aligning coupling structures on at least the first and the second work pieces with a coupling structure on a third work piece, the method further comprising:
   locating a third outer bushing having a passage in an aperture formed in the third work piece;
   securing the third outer bushing in the aperture via cold work expansion;
   locating a third eccentric bushing having a passage in the passage of the third outer bushing;
   rotating at least one of the first, the second, and the third eccentric bushing to approximately align the passages thereof; and
   securing the third eccentric bushing with the passage thereof approximately aligned with the passages of the first and the second eccentric bushings via cold work expansion.

19. The method of claim 17, further comprising:
   locating at least one washer between at least a first pair of the respective bushings.

20. The method of claim 17, further comprising:
   checking an alignment of the respective eccentric bushings with a mandrel.

21. The method of claim 17, wherein the inner and outer circumferences of the first eccentric bushing are centered about the respective first and second axes of the first eccentric bushing throughout a longitudinal length of the first eccentric bushing between the first and second ends of the first eccentric bushing.

* * * * *